United States Patent
Ohlsson

(10) Patent No.: US 7,601,409 B2
(45) Date of Patent: Oct. 13, 2009

(54) STRETCH FILM

(75) Inventor: Stefan Bertil Ohlsson, Wespelaar (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 92 days.

(21) Appl. No.: 10/646,239

(22) Filed: Aug. 22, 2003

(65) Prior Publication Data

US 2004/0048019 A1 Mar. 11, 2004

Related U.S. Application Data

(60) Provisional application No. 60/408,318, filed on Sep. 5, 2002.

(51) Int. Cl.
*B32B 27/32* (2006.01)
*B32B 1/08* (2006.01)

(52) U.S. Cl. ............... 428/35.7; 428/34.1; 428/34.2; 428/35.9; 428/36.92; 428/500; 428/515; 428/521; 428/523; 526/88; 526/160; 526/340.2; 526/348; 526/348.1; 526/348.2; 526/943

(58) Field of Classification Search ............... 428/35.7, 428/36.92, 500, 515, 521, 523; 526/348, 526/88, 160, 340.2, 348.2, 943, 348.1
See application file for complete search history.

(56) References Cited

U.S. PATENT DOCUMENTS

| | | | |
|---|---|---|---|
| 4,243,619 A | 1/1981 | Fraser et al. | |
| 4,540,753 A | 9/1985 | Cozewith et al. | |
| 4,543,399 A | 9/1985 | Jenkins, III et al. | |
| 4,588,790 A | 5/1986 | Jenkins, III et al. | |
| 4,892,851 A | 1/1990 | Ewen et al. | |
| 5,026,798 A | 6/1991 | Canich | |
| 5,055,438 A | 10/1991 | Canich | |
| 5,057,475 A | 10/1991 | Canich et al. | |
| 5,153,157 A | 10/1992 | Hlatky et al. | |
| 5,206,075 A | 4/1993 | Hodgson, Jr. | |
| 5,241,025 A | 8/1993 | Hlatky et al. | |
| 5,264,405 A | 11/1993 | Canich | |

(Continued)

FOREIGN PATENT DOCUMENTS

EP 277 004 8/1988

(Continued)

OTHER PUBLICATIONS

L. Wild et al., "*Determination of Branching Distributions in Polyethylene and Ethylene Copolymers*," Journal of Polymer Science, vol. 20, pp. 441-455, 1982.

(Continued)

*Primary Examiner*—Marc A Patterson

(57) ABSTRACT

Stretch films are disclosed, the films having at least one layer formed of or including a polyethylene copolymer and having a natural draw ratio of at least 250%, a tensile stress at the natural draw ratio of at least 22 MPa, and a tensile stress at second yield of at least 12 MPa. In some embodiments, the polyethylene copolymer can have a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and an Mw/Mn ratio of from 2.5 to 5.5. The stretch films are particularly useful in bundling and packaging applications.

7 Claims, 2 Drawing Sheets

U.S. PATENT DOCUMENTS

| | | | |
|---|---|---|---|
| 5,334,677 | A | 8/1994 | Razavi et al. |
| 5,350,723 | A | 9/1994 | Neithamer et al. |
| 5,352,749 | A | 10/1994 | DeChellis et al. |
| 5,405,922 | A | 4/1995 | DeChellis et al. |
| 5,416,228 | A | 5/1995 | Ewen et al. |
| 5,436,304 | A | 7/1995 | Griffin et al. |
| 5,449,651 | A | 9/1995 | Reddy et al. |
| 5,462,999 | A | 10/1995 | Griffin et al. |
| 5,569,693 | A | 10/1996 | Doshi et al. |
| 5,763,543 | A | 6/1998 | Muhle et al. |
| 6,132,827 | A * | 10/2000 | Miro .................. 428/35.9 |
| 6,218,484 | B1 | 4/2001 | Brown et al. |
| 6,255,426 | B1 * | 7/2001 | Lue et al. .................. 526/348 |
| 6,358,457 | B1 * | 3/2002 | Wong et al. .............. 264/289.6 |
| 6,482,532 | B1 * | 11/2002 | Yap et al. .................. 428/516 |

FOREIGN PATENT DOCUMENTS

| | | |
|---|---|---|
| EP | 426 638 | 5/1991 |
| EP | 495 375 | 7/1992 |
| EP | 500 944 | 9/1992 |
| EP | 520 732 | 12/1992 |
| EP | 570 982 | 11/1993 |
| EP | 612 768 | 8/1994 |
| EP | 427 697 | 5/1996 |
| EP | 982362 A1 * | 3/2000 |
| WO | WO 91/09882 | 7/1991 |
| WO | WO 93/03093 | 2/1993 |
| WO | WO 91/09148 | 5/1993 |
| WO | WO 93/09148 | 5/1993 |
| WO | WO 93/14132 | 7/1993 |
| WO | WO 94/03506 | 2/1994 |
| WO | WO 96/02244 | 2/1996 |
| WO | WO 96/08520 | 3/1996 |
| WO | WO 98/44011 | 10/1998 |
| WO | WO 2004/022634 | 3/2004 |

OTHER PUBLICATIONS

G. Ver Strate et al., "*Near monodisperse Ethylene-Propylene Copolymers by Direct Ziegler-Natta Polymerization. Preparation, Characterization, Properties,*" Macromolecules, vol. 21, pp. 3360-3371, 1988.

A.C. Ouano et al., "*Gel Permeation Chromatography,*" Chapter 6, Marcel Dekker, Inc., NY, pp. 287-369, 1975.

Rodriguez, F., "*Principles of Polymer Systems,*" 3rd ed., Hemisphere Pub Corp., NY, pp. 155-160, 1989.

Abraham, D. et al., *Die Angewandle Makromolekulare Chemie* 200 (1992) pp. 15-25 (Nr. 3468) *Studies on LDPE/LLDPE blends*.

\* cited by examiner

STRETCH FILM

1. CROSS-REFERENCE TO RELATED APPLICATIONS

The present application claims the benefit of U.S. Provisional Application No. 60/408,318, filed Sep. 5, 2002, said application incorporated herein by reference.

2. FIELD OF THE INVENTION

The present invention is directed generally to polyethylene stretch films. In particular, the invention provides monolayer or multilayer stretch films including in at least one layer a metallocene-catalyzed polyethylene resin, and articles wrapped with such films.

3. BACKGROUND

Stretch films are widely used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include cling-enhancing additives such as tackifiers, and non-cling or slip additives, as desired, to tailor the slip/cling properties of the film. Typical polymers used in the cling layer of conventional stretch films include, for example, ethylene vinyl acetate, ethylene methyl acrylate, and very low density polyethylenes having a density of less than about 0.912 g/cm$^3$.

It is desirable to maximize the degree to which a stretch film is stretched, as expressed by the percent of elongation of the stretched film relative to the unstretched film, and termed the "stretch ratio." At relatively larger stretch ratios, the film imparts greater holding force. Further, films which can be used at larger stretch ratios with adequate holding force and film strength offer economic advantages, since less film is required for packaging or bundling.

FIG. 1 shows an idealized tensile stress versus elongation curve 10 for a hypothetical stretch film. Curve 10 includes a first yield point 12, a second yield point 14, a natural draw ratio point 16, and a break point 18. Vertical line A passes through the first yield point 12, and indicates the elongation at first yield; horizontal line A' passes through the first yield point 12, and indicates the tensile stress at first yield. Vertical line B passes through the second yield point 14, and indicates the elongation at second yield; horizontal line B' passes through the second yield point 14, and indicates the tensile stress at second yield. Vertical line C passes through the natural draw ratio point 16, and indicates the elongation at the natural draw ratio point, this elongation value hereinafter termed simply the "natural draw ratio"; horizontal line C' passes through the natural draw ratio point 16, and indicates the tensile stress at the natural draw ratio point. Vertical line D passes through the break point 18, and indicates the elongation at break; horizontal line D' passes through the break point 18, and indicates the tensile stress at break. Region 20 of the curve, i.e., the region between the second yield point 14 and the natural draw ratio point 16, is termed the "yield plateau" region. Region 10 of the curve, i.e., the region between the natural draw ratio point 16 and the break point 18, is termed the "strain hardening region". While these regions and features are shown in idealized form for a hypothetical film, it should be appreciated that in an actual film the stress-elongation curve has a continuous first derivative.

Several properties are desired in a stretch film. The tensile stress of the yield plateau, as characterized by the tensile stress at the second yield point 14 and at the natural draw ratio 16, correlates to the holding force the film can apply when stretched and wrapped around an article or a bundle of articles. Thus, it is desirable to have a large tensile stress at second yield and a large tensile stress at the natural draw ratio. The slope of the yield plateau 20 corresponds to the change in holding force as elongation increases, and so must be non-negative to avoid film failure. In a film with a positive, near-zero slope, as the film is stretched a small decrease in the film thickness due to small fluctuations in thickness uniformity can result in a large fluctuation in elongation, giving rise to bands of weaker and more elongated film transverse to the direction of stretching, a defect known as "tiger striping". Thus, it is desirable to have a yield plateau slope large enough to avoid tiger striping over typical thickness variations of, for example, ±5%. For robust operation over a wide range of elongation, and using a wide variety of stretching apparatus, it is desirable to have a broad yield plateau region. In addition, since the extent of elongation correlates inversely with the amount of film that must be used to bundle an article, it is desirable for the film to be stretchable to a large elongation. While in principle the elongation at break is the maximum possible elongation, in practice, the natural draw ratio is a better measure of maximum elongation. Thus, it is desirable to have a large natural draw ratio. Other desirable properties, not illustrated in a stress-elongation curve, include high cling force and good puncture resistance.

While prior efforts have resulted in films having improved performance in one or several of the above-described properties, known films have not successfully displayed the combination of a large natural draw ratio, a large tensile stress at second yield and at the natural draw ratio, and a positive yield plateau slope large enough to absorb typical variations in film thickness uniformity without tiger striping.

4. SUMMARY OF THE INVENTION

In one embodiment, the invention provides a stretch film having at least one layer formed of or including a polyethylene copolymer, the film having a natural draw ratio of at least 250%, a tensile stress at the natural draw ratio of at least 22 MPa, and a tensile stress at second yield of at least 12 MPa, where tensile stress is the machine direction stress as determined by ASTM D882. In one aspect of this embodiment, the polyethylene copolymer can have a CDBI of at least 70%, a melt index $I_{2.16}$ of from 0.1 to 15 g/10 min., a density of from 0.910 to 0.940 g/cm$^3$, a melt index ratio $I_{21.6}/I_{2.16}$ of from 30 to 80, and a Mw/Mn ratio of from 2.5 to 5.5. In another aspect of this embodiment, a monolayer film formed of the polyethylene copolymer has a dart impact strength D, a modulus M, where M is the arithmetic mean of the machine direction and transverse direction 1% secant moduli, and a relation between D in g/μm and M in MPa such that:

$$D \geq 0.0315\left[100 + e^{(11.71 - 0.03887M + 4.592 \times 10^{-5}M^2)}\right].$$

In another embodiment, the invention provides a stretch film having at least one layer formed of or including a polyethylene copolymer having a CDBI of at least 70%, a melt index $I_{2.16}$ of from 0.1 to 15 g/10 min., a density of from 0.910 to 0.940 g/cm³, a melt index ratio $I_{21.6}/I_{2.16}$ of from 30 to 80, and an Mw/Mn ratio of from 2.5 to 5.5, wherein the film has a natural draw ratio of at least 250%, a tensile stress at the natural draw ratio of at least 22 MPa, and a tensile stress at second yield of at least 12 MPa, where tensile stress is the machine direction stress as determined by ASTM D882, and wherein the film has a dart impact strength D, a modulus M, where M is the arithmetic mean of the machine direction and transverse direction 1% secant moduli, and a relation between D in g/μm and M in MPa such that:

$$D \geq 0.0315 \left[ 100 + e^{(11.71 - 0.03887M + 4.592 \times 10^{-5}M^2)} \right].$$

In another embodiment, the invention provides a multilayer stretch film including a first surface layer, a second surface layer, and a core layer disposed between the first and second surface layers, wherein the core layer is formed of or includes a polyethylene copolymer, the film having a natural draw ratio of at least 250%, a tensile stress at the natural draw ratio of at least 22 MPa, and a tensile stress at second yield of at least 12 MPa, where tensile stress is the machine direction stress as determined by ASTM D882.

In another embodiment, the invention provides an article wrapped with any of the stretch films of the invention.

In another embodiment, the invention provides a method of wrapping an article by providing an article to be wrapped, providing any of the stretch films of the invention, and wrapping the article with the stretch film. The stretch film can be provided in a pre-stretched condition, or can be stretched during or before wrapping the article. The article to be wrapped can be, for example, a single item to be wrapped, or a collection of items to be bundled together, such as a pallet and a plurality of articles disposed on the pallet.

5. BRIEF DESCRIPTION OF THE DRAWINGS

6. DETAILED DESCRIPTION 6.1 Polyethylene Resins

Figure 1:
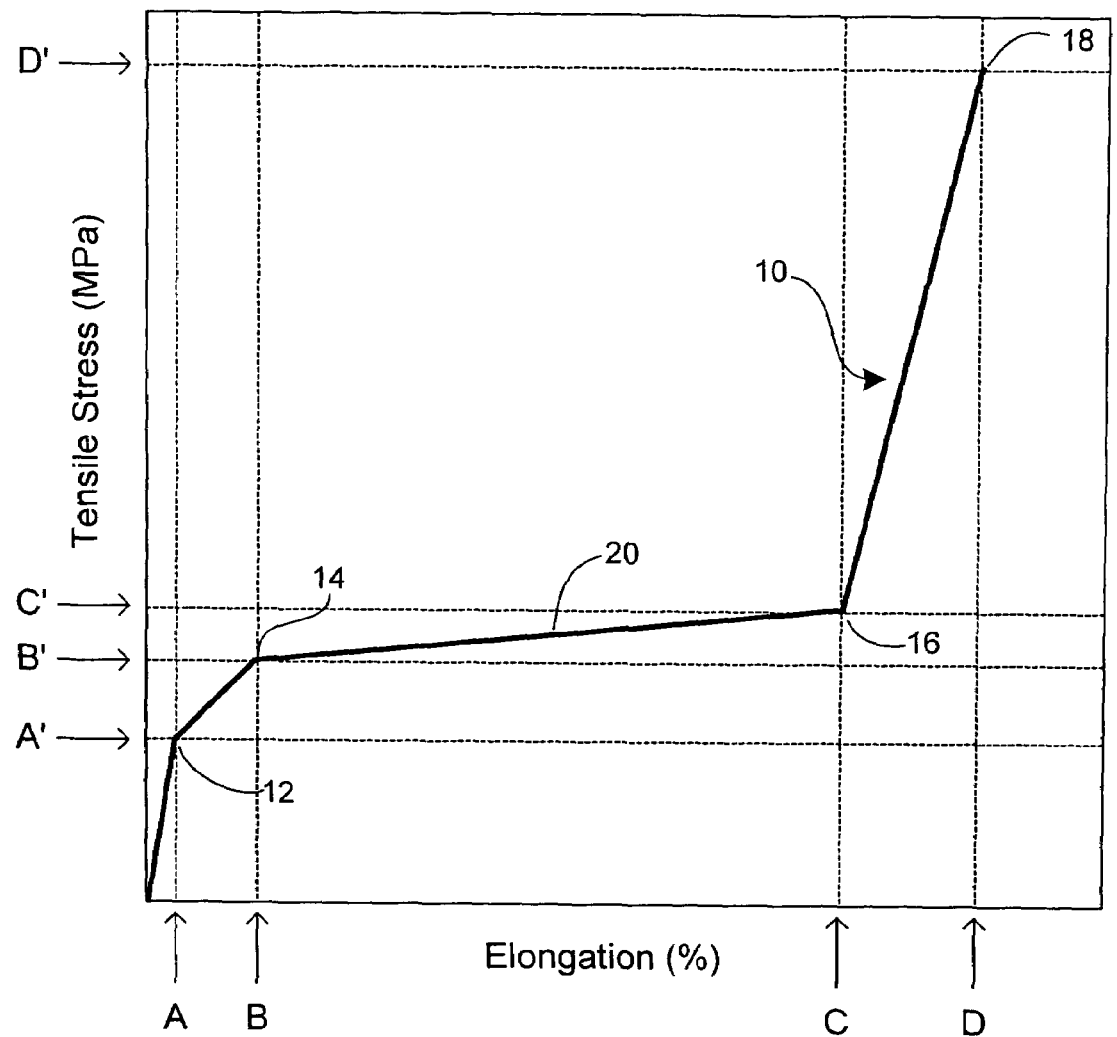
FIG. 1 shows an idealized stress-elongation diagram for a hypothetical stretch film.

Polyethylene resins suitable for the stretch films described herein are copolymers of ethylene and at least one comonomer. Polymers having more than two types of monomers, such as terpolymers, are also included within the term "copolymer" as used herein. As used herein, the term "ethylene copolymer" indicates a polymer formed of more than 50 mol % polymerized ethylene units, and the remaining less than 50 mol % polymerized units being polymerized α-olefin comonomers, such as $C_3$-$C_{20}$ α-olefins or $C_3$-$C_{12}$ α-olefins. The α-olefin comonomer can be linear or branched, and two or more comonomers can be used, if desired. Examples of suitable comonomers include linear $C_3$-$C_{12}$ α-olefins, and α-olefins having one or more $C_1$-$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers may include polar vinyl, conjugated and non-conjugated dienes, acetylene and aldehyde monomers, which can be included in minor amounts in terpolymer compositions. Non-conjugated dienes useful as comonomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the polyethylene polymer and the specific comonomers selected. For a given comonomer, the density of the polyethylene polymer produced therefrom decreases as the comonomer content increases. One skilled in the art can readily determine the comonomer content needed to produce a copolymer having a desired density.

In general, suitable polyethylene resins can be produced using a gas-phase metallocene-catalyzed polymerization process in a fluidized-bed reactor. Further details of the catalysts and process are given below.

The polyethylene resins suitable for use in the films of the present invention are described more fully in U.S. Pat. No. 6,255,426.

Suitable polyethylene resins can have one or more of the following properties, with ranges from any lower limit to any upper limit being contemplated:

(a) a composition distribution breadth index ("CDBI") of at least 70% or at least 75% or at least 80%;

(b) a melt index $I_{2.16}$ of from a lower limit of 0.1 or 0.3 to an upper limit of 10 or 15 g/10 min;

(c) a density of from a lower limit of 0.910 or 0.916 or 0.918 to an upper limit of 0.940 or 0.935 or 0.930 or 0.927 g/cm³;

(d) a melt index ratio $I_{21.6}/I_{2.16}$ of from a lower limit of 30 or 35 to an upper limit of 80 or 60; and (e) an Mw/Mn ratio of from a lower limit of 2.5 or 2.8 or 3.0 or 3.2 to an upper limit of 5.5 or 4.5 or 4.0 or 3.8.

Preferred embodiments have all of the characteristics (a)-(e), with any of the combinations of lower and upper limits recited. Thus, for example, in one embodiment, the polyethylene resin has a CDBI of at least 70%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5.

In another embodiment, the polyethylene resin has a CDBI of at least 75%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5.

In another embodiment, the polyethylene resin has a CDBI of at least 80%, a melt index $I_{2.16}$ of from 0.1 to 15 g/10 min, a density of from 0.910 to 0.940 g/cm$^3$, a melt index ratio $I_{21.6}/I_{2.16}$ of from 30 to 80, and an Mw/Mn ratio of from 2.5 to 5.5.

In another embodiment, the polyethylene resin has the properties of any of the embodiments above, except that the melt index $I_{2.16}$ is from 0.1 to 10 g/10 min.

In another embodiment, the polyethylene resin has the properties of any of the embodiments above, except that the melt index $I_{2.16}$ is from 0.3 to 15 g/10 min.

In another embodiment, the polyethylene resin has the properties of any of the embodiments above, except that the melt index $I_{2.16}$ is from 0.3 to 10 g/10 min.

In another embodiment, the polyethylene resin has the properties of any of the embodiments above, except that the density is from 0.910 to 0.935 g/cm$^3$.

In another embodiment, the polyethylene resin has the properties of any of the embodiments above, except that the density is from 0.910 to 0.930 g/cm$^3$.

In another embodiment, the polyethylene resin has the properties of any of the embodiments above, except that the density is from 0.910 to 0.927 g/cm$^3$.

In another embodiment, the polyethylene resin has the properties of any of the embodiments above, except that the density is from 0.916 to 0.940 g/cm$^3$.

In another embodiment, the polyethylene resin has the properties of any of the embodiments above, except that the density is from 0.916 to 0.935 g/cm$^3$.

In another embodiment, the polyethylene resin has the properties of any of the embodiments above, except that the density is from 0.916 to 0.930 g/cm$^3$.

In another embodiment, the polyethylene resin has the properties of any of the embodiments above, except that the density is from 0.916 to 0.927 g/cm$^3$.

In another embodiment, the polyethylene resin has the properties of any of the embodiments above, except that the density is from 0.918 to 0.940 g/cm$^3$.

In another embodiment, the polyethylene resin has the properties of any of the embodiments above, except that the density is from 0.918 to 0.935 g/cm$^3$.

In another embodiment, the polyethylene resin has the properties of any of the embodiments above, except that the density is from 0.918 to 0.930 g/cm$^3$.

In another embodiment, the polyethylene resin has the properties of any of the embodiments above, except that the density is from 0.918 to 0.927 g/cm$^3$.

In another embodiment, the polyethylene resin has the properties of any of the embodiments above, except that the melt index ratio $I_{21.6}/I_{2.16}$ is from 30 to 60.

In another embodiment, the polyethylene resin has the properties of any of the embodiments above, except that the melt index ratio $I_{21.6}/I_{2.16}$ is from 35 to 80.

In another embodiment, the polyethylene resin has the properties of any of the embodiments above, except that the melt index ratio $I_{21.6}/I_{2.16}$ is from 35 to 60.

In another embodiment, the polyethylene resin has the properties of any of the embodiments above, except that the Mw/Mn ratio is from 2.5 to 4.5.

In another embodiment, the polyethylene resin has the properties of any of the embodiments above, except that the Mw/Mn ratio is from 2.5 to 4.0.

In another embodiment, the polyethylene resin has the properties of any of the embodiments above, except that the Mw/Mn ratio is from 2.5 to 3.8.

In another embodiment, the polyethylene resin has the properties of any of the embodiments above, except that the Mw/Mn ratio is from 2.8 to 5.0.

In another embodiment, the polyethylene resin has the properties of any of the embodiments above, except that the Mw/Mn ratio is from 2.8 to 4.5.

In another embodiment, the polyethylene resin has the properties of any of the embodiments above, except that the Mw/Mn ratio is from 2.8 to 4.0.

In another embodiment, the polyethylene resin has the properties of any of the embodiments above, except that the Mw/Mn ratio is from 2.8 to 3.8.

In another embodiment, the polyethylene resin has the properties of any of the embodiments above, except that the Mw/Mn ratio is from 3.0 to 5.5.

In another embodiment, the polyethylene resin has the properties of any of the embodiments above, except that the Mw/Mn ratio is from 3.0 to 4.5.

In another embodiment, the polyethylene resin has the properties of any of the embodiments above, except that the Mw/Mn ratio is from 3.0 to 4.0.

In another embodiment, the polyethylene resin has the properties of any of the embodiments above, except that the Mw/Mn ratio is from 3.0 to 3.8.

In another embodiment, the polyethylene resin has the properties of any of the embodiments above, except that the Mw/Mn ratio is from 3.2 to 5.5.

In another embodiment, the polyethylene resin has the properties of any of the embodiments above, except that the Mw/Mn ratio is from 3.2 to 4.5.

In another embodiment, the polyethylene resin has the properties of any of the embodiments above, except that the Mw/Mn ratio is from 3.2 to 4.0.

In another embodiment, the polyethylene resin has the properties of any of the embodiments above, except that the Mw/Mn ratio is from 3.2 to 3.8.

In addition to the properties recited above, the polyethylene resins can be characterized in terms of their properties in monolayer films. Such properties do not limit the polyethylene resins to monolayer film applications, but provide a further means of characterizing the resins in terms of properties evident in monolayer films formed from the resins.

Thus, in another embodiment, the polyethylene resin according to any of the above embodiments is further characterized in that a monolayer film formed from the resin has a Haze value of less than 20%, as measured according to ASTM D-1003-95.

In another embodiment, the polyethylene resin according to any of the above embodiments is further characterized in that a monolayer film formed from the resin has a Haze value of less than 15%, as measured according to ASTM D-1003-95.

In another embodiment, the polyethylene resin according to any of the above embodiments is further characterized in that a monolayer film formed from the resin has an Averaged Modulus M of from 20000 psi (140 MPa) to 60000 psi (420 MPa), where M is the arithmetic mean of the machine direction and transverse direction 1% secant moduli as determined according to ASTM D-882-97.

In another embodiment, the polyethylene resin according to any of the above embodiments is further characterized in that a monolayer film formed from the resin has a Dart Impact Strength of from 120 to 1000 g/mil (4.7 to 40 g/µm).

In another embodiment, the polyethylene resin according to any of the above embodiments is further characterized in that a monolayer film formed from the resin has a Dart Impact Strength of from 120 to 800 g/mil (4.7 to 32 g/µm).

In another embodiment, the polyethylene resin according to any of the above embodiments is further characterized in that a monolayer film formed from the resin has a Dart Impact Strength of from 150 to 1000 g/mil (5.9 to 40 g/µm).

In another embodiment, the polyethylene resin according to any of the above embodiments is further characterized in that a monolayer film formed from the resin has a Dart Impact Strength of from 150 to 800 g/mil (5.9 to 32 g/µm).

In another embodiment, the polyethylene resin according to any of the above embodiments is further characterized in that a monolayer film formed from the resin has a relation between the Averaged Modulus M and Dart Impact Strength (D) complying with formula (1a)

$$D \geq 0.8\left[100 + e^{(11.71 - 0.000268M + 2.183\times10^{-9}M^2)}\right] \quad (1a)$$

where M is expressed in units of psi and D is in units of g/mil, or equivalently, complying with formula (1b)

$$D \geq 0.0315\left[100 + e^{(11.71 - 0.03887M + 4.592\times10^{-5}M^2)}\right] \quad (1b)$$

where M is expressed in units of MPa and D is in units of g/µm. In both formulae, "e" is the natural logarithm base, 2.718.

6.1.1 Catalysts for Producing Polyethylene Resins

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. In general, a metallocene catalyst precursor can be one of, or a mixture of metallocene compounds of either or both of the following types:

Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

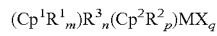

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two R' and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula

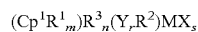

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{2-0}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Preferred metallocenes are biscyclopentadienyl compounds, preferably bridged by a bridging group including a single carbon, germanium or silicon atom.

Illustrative, but not limiting, examples of suitable biscyclopentadienyl metallocenes of the type described in group (1) above are the racemic isomers of:

μ-(CH₃)₂Si(indenyl)₂M(Cl)₂;
μ-(CH₃)₂Si(indenyl)₂M(CH₃)₂;
μ-(CH₃)₂Si(tetrahydroindenyl)₂M(Cl)₂;
μ-(CH₃)₂Si(tetrahydroindenyl)₂M(CH₃)₂;
μ-(CH₃)₂Si(indenyl)₂M(CH₂CH₃)₂; and
μ-(C₆H₅)₂C(indenyl)₂M(CH₃)₂;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

μ-(C₆H₅)₂C(cyclopentadienyl)(fluorenyl)M(R)₂;
μ-(C₆H₅)₂C(3-methylcyclopentadienyl)(fluorenyl)M(R)₂;
μ-(CH₃)₂C(cyclopentadienyl)(fluorenyl)M(R)₂;
μ-(C₆H₅)₂C(cyclopentadienyl)(2-methylindenyl)M(CH₃)₂;
μ-(C₆H₅)₂C(3-methylcyclopentadienyl)(2-methylindenyl)M(Cl)₂;
μ-(C₆H₅)₂C(cyclopentadienyl)(2,7-dimethylfluorenyl)M(R)₂; and
μ-1-(CH₃)₂C(cyclopentadienyl)(2,7-dimethylfluorenyl)M(R)₂;

wherein M is Zr or Hf, and R is C₁ or CH₃.

Examples of monocyclopentadienyl metallocenes of the type described in group (2) above are disclosed in U.S. Pat. Nos. 5,026,798; 5,057,475; 5,350,723; 5,264,405; 5,055,438; and in WO 96/002244.

The metallocene compounds are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms. Examples of noncoordinating anions can be found in European Publication EP 277 004.

An additional method of making metallocene catalysts uses ionizing anionic pre-cursors which are initially neutral Lewis acids but form the cation and anion upon ionizing reaction with the metallocene compounds. For example, tris (pentafluorophenyl) boron acts to abstract an alkyl, hydride or silyl ligand from the metallocene compound to yield a metallocene cation and a stabilizing non-coordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl)borate;
tributylammonium tetrakis(pentafluorophenyl)borate; and
tri(n-butyl)ammonium tetrakis(o-tolyl)borate;

N,N-dialkyl anilinium salts such as:
N,N-dimethylanilinium tetrakis(pentafluorophenyl)borate;
N,N-dimethylaniliniumtetrakis(heptafluoronaphthyl)borate;
N,N-dimethylanilinium tetrakis(perfluoro-4-biphenyl)borate;
N,N-dimethylanilinium tetraphenylborate;
N,N-diethylanilinium tetraphenylborate; and
N,N-2,4,6-pentamethylanilinium tetraphenylborate;

dialkyl ammonium salts such as:
di-(isopropyl)ammonium tetrakis(pentafluorophenyl)borate; and
dicyclohexylammonium tetraphenylborate; and triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:

tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl)borate;
benzene (diazonium) phenyl-tris(pentafluorophenyl)borate;
tropillium tetrakis(2,3,5,6-tetrafluorophenyl)borate;
triphenylmethylium tetrakis(2,3,5,6-tetrafluorophenyl)borate;
benzene (diazonium) tetrakis(3,4,5-trifluorophenyl)borate;
tropillium tetrakis(3,4,5-trifluorophenyl)borate;
benzene (diazonium) tetrakis(3,4,5-trifluorophenyl)borate;
tropillium tetrakis(3,4,5-trifluorophenyl)aluminate;

triphenylmethylium tetrakis(3,4,5-trifluorophenyl)aluminate;

benzene (diazonium) tetrakis(3,4,5-trifluorophenyl)aluminate;

tropillinum tetrakis(1,2,2-trifluoroethenyl)borate;

triphenylmethylium tetrakis(1,2,2-trifluoroethenyl)borate;

benzene (diazonium) tetrakis(1,2,2-trifluoroethenyl)borate;

tropillium tetrakis(2,3,4,5-tetrafluorophenyl)borate;

triphenylmethylium tetrakis(2,3,4,5-tetrafluorophenyl) borate; and benzene (diazonium) tetrakis(2,3,4,5-tetrafluorophenyl) borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, triisobutyl aluminum, isobutyl aluminumoxane, those having bulky substituents covalently bound to the metal or metalloid center being preferred to minimize adverse interaction with the active catalyst.

Preferably, no scavenging compounds are used, and the reaction is carried out under conditions of substantially no scavengers. The terms "substantially no scavengers" and "substantial devoid or free of Lewis acid scavengers" as used herein indicate less than 100 ppm by weight of such scavengers present in the feed gas to the reactor, or preferably, no intentionally added scavenger, e.g., an aluminum alkyl scavenger, other than that which may be present on the support.

Preferably the catalyst is substantially devoid of non-bridged metallocene compounds; i.e., no such metallocene is intentionally added to the catalyst, or preferably, no such metallocene can be identified in such catalyst. Preferred catalysts are a compounds including a pair of pi bonded ligands (such as cyclopentadienyl ligands) at least one of which has a structure with at least two cyclic fused rings, such as indenyl rings. In a particular embodiment, the metallocene is a substantially single metallocene species including a monoatom silicon bridge connecting two polynuclear ligands pi bonded to the transition metal atom. A particular example of such a bridged metallocene compound is dimethylsilyl-bis-(tetrahydroindenyl) zirconium dichloride, also denoted as $(CH_3)_2Si(H_4Ind)_2ZrCl_2$, where the term "$H_4Ind$" indicates a tetrahydroindenyl group.

The catalyst is preferably supported on silica with the catalyst homogeneously distributed in the silica pores. Preferably, fairly small amounts of methyl alumoxane should be used, such as amounts giving an Al to transition metal molar ratio of from 400 to 30 or from 200 to 50.

6.1.2 Processes for Producing Polyethylene Resins

Suitable processes for producing polyethylene resins are well known in the art. A preferred process is a steady-state polymerization process, such as in a gas-phase fluidized-bed reactor.

Gas phase processes for the homopolymerization and copolymerization of monomers, especially olefin monomers, are well known in the art. Such processes can be conducted, for example, by introducing the gaseous monomer or monomers into a stirred and/or fluidized bed of resin particles and catalyst.

In the fluidized-bed polymerization of olefins, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid. The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction, and it is therefore necessary to cool the bed to remove the heat of polymerization. In the absence of such cooling, the bed would increase in temperature until, for example, the catalyst became inactive or the polymer particles melted and began to fuse.

In the fluidized-bed polymerization of olefins, a typical method for removing the heat of polymerization is by passing a cooling gas, such as the fluidizing gas, which is at a temperature lower than the desired polymerization temperature, through the fluidized-bed to conduct away the heat of polymerization. The gas is removed from the reactor, cooled by passage through an external heat exchanger and then recycled to the bed.

The temperature of the recycle gas can be adjusted in the heat exchanger to maintain the fluidized-bed at the desired polymerization temperature. In this method of polymerizing alpha olefins, the recycle gas generally includes one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

The material exiting the reactor includes the polyolefin and a recycle stream containing unreacted monomer gases. Following polymerization, the polymer is recovered. If desired, the recycle stream can be compressed and cooled, and mixed with feed components, whereupon a gas phase and a liquid phase are then returned to the reactor.

A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4,243,619, 4,543,399, 5,352,749, 5,436,304, 5,405,922, 5,462,999, and 6,218,484, the disclosures of which are incorporated herein by reference. Suitable process conditions can be determined by one skilled in the art, and are described in PCT publication WO 96/08520 and in U.S. Pat. Nos. 5,763,543 and 6,255,426.

In a specific embodiment, a polyethylene resin is produced by continuously circulating a feed gas stream containing monomer and inerts to thereby fluidize and agitate a bed of polymer particles, adding metallocene catalyst to the bed and removing polymer particles, wherein the catalyst includes at least one bridged bis-cyclopentadienyl transition metal and an alumoxane activator on a common or separate porous support; the feed gas is substantially devoid of a Lewis acidic scavenger and wherein any Lewis acidic scavenger is present in an amount less than 100 wt. ppm of the feed gas; the temperature in the fluidized-bed is no more than 20° C. less than the polymer melting temperature as determined by DSC, at an ethylene partial pressure in excess of 60 psi absolute (410 kpaa); and the removed polymer particles have an ash content of transition metal of less than 500 wt. ppm, the polymer melt index $I_{2.16}$ is less than 10, the MIR is at least 35, and the polymer has substantially no detectable chain end unsaturation as determined by proton nuclear magnetic resonance ($^1$HNMR).

By "substantially no detectable end chain unsaturation" is meant that the polymer has vinyl unsaturation of less than 0.1 vinyl groups per 1000 carbon atoms in the polymer, or less than 0.05 vinyl groups per 1000 carbon atoms, or less than 0.01 vinyl groups per 1000 carbon atoms.

6.2 Stretch Films

The above-described polyethylene resins are particularly suitable for stretch film applications. It has been surprisingly found that films of the invention exhibit improved properties, such as applicability over a wide range of stretch ratios without suffering from local deformation leading to break, hole formation, tiger striping, or other defects. Films of embodiments of the invention also show higher holding force than conventional films of the same film thickness.

Films of the invention can be cast or blown films having a single layer (monolayer films) or multiple layers (multilayer films). When used in multilayer films, the polyethylene resins described herein can be used in any layer of the film, or in more than one layer of the film, as desired. When more than one layer of the film is formed of, or includes, a polyethylene resin of the present invention, each such layer can be individually formulated; i.e., the layers formed of or including the polyethylene resin can have the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional film layer as defined below, and "B" indicates a film layer formed of the polyethylene resin or a blend including the polyethylene resin of the present invention. Where a film includes more than one A layer or more than one B layer, one or more prime symbols (', ", "', etc.) are appended to the A or B symbol to indicate layers of the same type (conventional or inventive) that can be the same or can differ in one or more properties, such as chemical composition, density, melt index, thickness, etc., within the range of these parameters defined herein. Finally, the symbols for adjacent layers are separated by a slash (/). Using this notation, a three-layer film having an inner layer of the polyethylene resin or blend of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 μm each and a B layer of 30 μm is denoted as 20/60/20.

For the various films described herein, the "A" layer or layers can be formed of any material known in the art for use in multilayer films or in film-coated products. Thus, for example, an A layer can be formed of a polyethylene homopolymer or copolymer, and the polyethylene can be, for example, a VLDPE, a low density polyethylene (LDPE), a conventional LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, an A layer can be a blend of two or more such polyethylenes, and can include additives known in the art. One skilled in the art will understand that the layers of a multilayer film must have the appropriate viscosity match.

The "B" layer is formed of a polyethylene resin or a blend including a polyethylene resin of the invention, and can be any of such resins or blends described herein.

Polymer blends are also contemplated. Thus, the B layer can be a blend of one or more polyethylene resin as described herein, or a blend of one or more polyethylene resins as described herein with one or more additional resins. The latter blend can include, for example, a polyethylene of the invention blended with a compatible LDPE, VLDPE, plastomer, MDPE or HDPE resin, or other compatible polymeric resins.

When the film is a monolayer film, the resin and film have the properties described herein for a B layer.

As noted above, when a multilayer film has two or more B layers, the B layers can be the same, or can differ in thickness, chemical composition, density, melt index, CDBI, MWD, additives used, or other properties.

The thickness of each layer of the film, and of the overall film, is not particularly limited, but is determined according to the desired properties of the film. Typical film layers have a thickness of about 1 to 1000 μm, more typically about 5 to 100 μm, and typical films have an overall thickness of 10 to 50 μm.

In one embodiment, the present invention provides a single-layer (monolayer) film formed of any of the polyethylene resins or blends of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, A/B/B', B/A/B' and B/B'/B";

(c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'";

(d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"'/"', B/A/B'/B"/B'", B/B'/A/B"/B'", and B/B'/B"/B'"'/B""";

and similar structures for films having six, seven, eight, nine or more layers. It should be appreciated that films having still more layers can be formed using the polymers and blends of the invention, and such films are within the scope of the invention.

As described below, the films can be extrusion cast films or blown films or produced or processed according to other known film processes.

The films can be tailored to specific applications by adjusting the thickness, materials and order of the various layers, as well as the additives in each layer. Films according to the invention are particularly suitable for stretch film applications. As used herein, the term "stretch film" indicates a monolayer or multilayer film capable of stretching and applying a restoring force. Such films are used, for example, in packaging applications, and in bundling articles such as on a pallet to facilitate shipping and handling. The films can be provided so that the user stretches the film upon application to provide a holding force, or can be provided in a pre-stretched condition. Such pre-stretched films, also included within the term "stretch film", are stretched and rolled after extrusion and cooling, and are provided to the end user in a pre-stretched condition, so that the film upon application provides a holding force by applying tension without the need for the end user to further stretch the film.

Additives can be provided in the various film layers, as is well-known in the art. For stretch film applications, an additive such as a tackifier can be used in one or more layers to provide a cling force. Suitable tackifiers and other additives are well-known. Suitable tackifiers include any known tackifier effective in providing cling force such as, for example, polybutenes, low molecular weight polyisobutylenes (PIB), polyterpenes, amorphous polypropylene, ethylene vinyl acetate copolymers, microcrystalline wax, alkali metal sulfosuccinates, and mono- and di-glycerides of fatty acids, such as glycerol monostearate, glycerol monooleate, sorbitan monolaurate, sorbitan monopalmitate, sorbitan monostearate and sorbitan monooleate. The tackifier, if used, can be used in any concentration which will impact the desired cling force, typically from 0.1 to 20% by weight and more typically from 0.25 to 6.0% by weight. Tackifiers can be used in monolayer films or in multiple layer films. In multiple layer films, a tackifier can be added to both outer layers to provide a stretch film having two-sided cling, or in only one outer layer, to provide a stretch film having one-sided cling.

6.2.1 Producing Films

Films may be formed by any number of well known extrusion or coextrusion techniques. Any of the blown or cast film techniques commonly used are suitable. For example, a resin composition can be extruded in a molten state through a flat die and then cooled to form a film, in a cast film process. Alternatively, the composition can be extruded in a molten state through an annular die and then blown and cooled to form a tubular, blown film, which can then be axially slit and unfolded to form a flat film. Films of the invention may be unoriented, uniaxially oriented or biaxially oriented. Physical properties of the film may vary from those of the polymer or polymer blend, depending on the film forming techniques used.

As a specific example, cast films can be prepared using a pilot scale commercial cast film line machine as follows. Pellets of a resin composition are melted at temperatures ranging from about 250° C. to about 300° C., with the specific melt temperature being chosen to match melt viscosities of the various resins. The melts are conveyed to a coextrusion adapter that combines the melt flows into a multilayer, coextruded structure. This layered flow is distributed through a single manifold film extrusion die to the desired width. The die gap opening is typically about 0.025 inches (about 635 μm). The material is then drawn down to the final gauge. The material draw down ratio is typically about 32:1 for 0.8 mil (20 μm) films. A vacuum box or air knife can be used to pin the melt exiting the die opening to a primary chill roll maintained at about 90° F. (32° C.).

As another example, blown films can be prepared as follows. The resin composition is introduced into the feed hopper of an extruder, such as a 63.5 mm extruder that is water-cooled, resistance heated, and has an L/D ratio of 24:1. The film can be produced using a 15.24 cm die with a 2.24 mm die gap, along with a dual orifice non-rotating, non-adjustable air ring. The film is extruded through the die into a film and cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or pre-stretched and wound. A particular blown film process and apparatus suitable for forming films according to embodiments of the present invention is described in U.S. Pat. No. 5,569,693.

Multiple-layer films may be formed by methods well known in the art. The materials forming each layer may be coextruded through a coextrusion feedblock and die assembly to yield a film with two or more layers adhered together but differing in composition. Coextrusion can be adapted to cast film or blown film processes. Multiple-layer films may also be formed by combining two or more single layer films prepared as described above. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end use performance, resin or copolymer employed, equipment capability and other factors.

6.3 Film Properties

Monolayer films of resins according to the invention can have the averaged modulus, haze, dart impact strength, and dart impact strength versus averaged modulus properties as described above. It should be appreciated that the monolayer properties described above define the polyethylene resin in a particular film form. Actual films, monolayer or multilayer, can have different overall properties, depending upon the additives used, the types of polymeric materials, if any, blended with the inventive polyethylene resins, the number and characteristics of different film layers, etc. These films, however, can still be defined in terms of the polyethylene resin used therein, the resin, in turn, being defined by its resin and monolayer film properties, as well as in terms of the properties of the desired film composition and structure.

Referring again to FIG. 1, the stress-elongation behavior is idealized for a hypothetical film. In an actual film, points 12 and 14 (first and second yield points) are inflection points. In poor film poorly suited to stretch applications, one or both of points 12 and 14 may be a local maximum. The yield plateau 20 and strain hardening region 10 form a curve (not shown) having a first derivative that is a continuous function, so that the stress elongation curve is non-linear in a region wherein the slope transitions between the slope of the yield plateau region and the slope of the strain hardening region. Thus, the natural draw ratio point 16 is defined by the intersection between a line drawn through a linear portion of the strain hardening region and a line drawn through a linear portion of the yield plateau region. The tensile stress at the natural draw ratio is defined by the actual, measured tensile stress at an elongation corresponding to the natural draw ratio, rather than as the tensile stress at the intersection of the two lines described above.

Figure 2A:
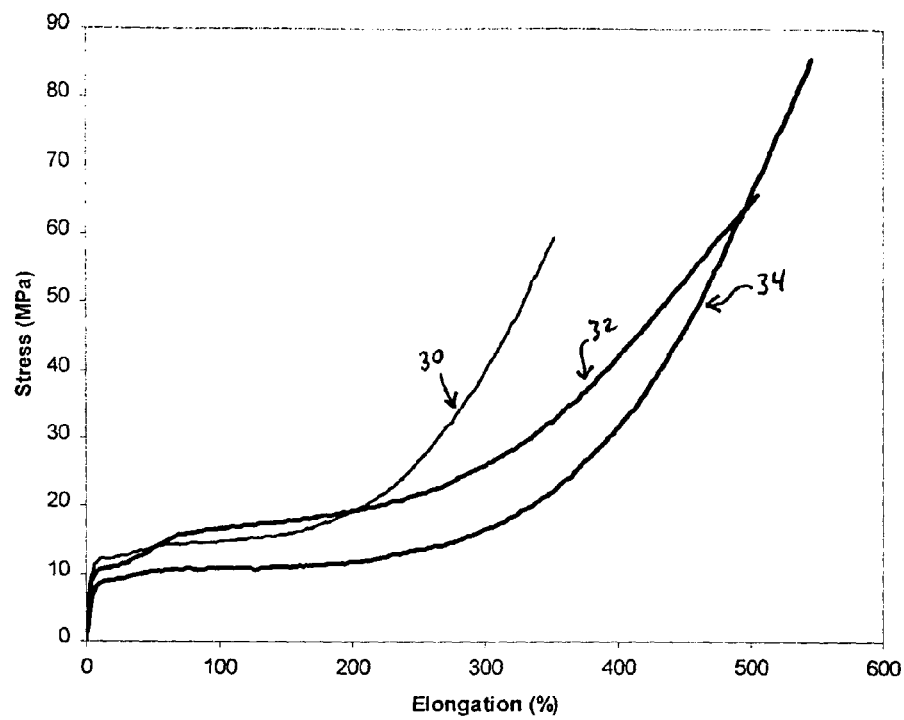
FIGS. 2A and 2B show stress-elongation curves for a stretch film according to the invention and for two comparative commercial stretch films.
Figure 2B:
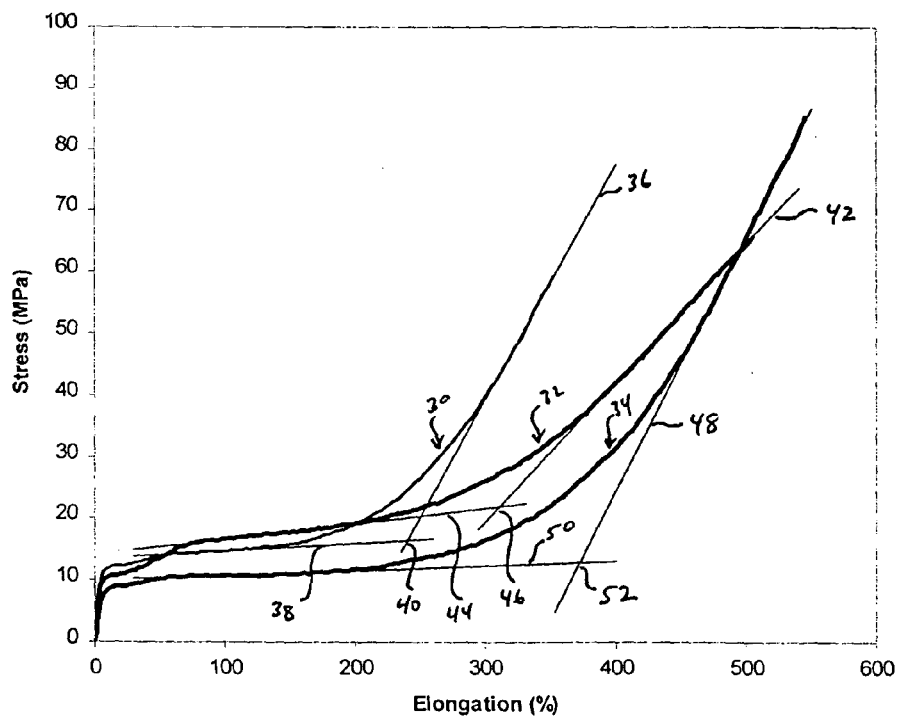

Referring now to FIGS. 2A and 2B, stress versus elongation curves (machine direction) are shown for a 25 μm monolayer stretch films: ELITE™ 5101, a 0.9215 g/cm³ density, 0.85 g/10 min. melt index $_{2.16}$ linear low density polyethylene (LLDPE) film resin available from The Dow Chemical Co., shown by curve 30; a 20 μm, 3-layer coextruded film (A/B/B') of the present invention produced using a bridged bis-Cp metallocene catalyst and having a density of 0.920 g/cm³ and a melt index of 1.0 g/10 min., shown by curve 32; and a 20 μm, 3-layer coextruded film (A/B/B') of EXCEED™ 1018, an LLDPE film resin available from ExxonMobil Chemical Co. having a density of 0.918 g/cm³ and a melt index of 1.0 g/10 min., shown by curve 34. The monolayer film was produced on a 75 mm, 30 L/D extruder with 200 mm die, 1.5 mm die gap and dual-lip air ring with internal bubble cooling system (IBC). The temperature setting on the extruder was 170-175° C., adapter 185° C. and the die 200° C., and output was 120 kg/hr. The coextruded films were produced on a 3-layer extrusion line with a 60 mm, 30 L/D extruder feeding the outer layer (A), a 90 mm, 30 L/D extruder feeding the core layer (B), and a 60 mm, 30 L/D extruder feeding the inner layer (B'). The die diameter was 355 mm, die gap was 1.6 mm, a dual lip air ring with IBC was used, and output was 241 kg/hr. The temperature setting on the A extruder was 175° C. and on the B/B' extruders was 190° C. The setting on the die was 200° C. The A layer (cling layer) accounted for 15% of the total film thickness and was formed of EXACT™ 8201, a commercially available metallocene-catalyzed plastomer having a melt index $I_{2.16}$ of 1.1 g/10 min. and a density of 0.882 g/cm³, available from DEX Plastomers NL.

The data shown in the curves are given in Tables 5-7 as described in Example 5 herein. In FIG. 2B, lines 36 and 38 are calculated linear regression fits to the linear portions of the strain hardening region and yield plateau region, respectively, of curve 30. The intersection 40 of lines 36 and 38 corresponds to the natural draw ratio of the film, and the measured stress at an elongation equal to the natural draw ratio is the tensile stress at the natural draw ratio. Thus, in curve 30, for example, the natural draw ratio is 240%, and the measured stress at 240% elongation is 25 MPa. Similarly, lines 42 and 44 are calculated linear regression fits to the linear portions of the strain hardening region and yield plateau region, respectively, of curve 32, and the intersection 46 of lines 42 and 44 corresponds to the natural draw ratio of the film, 310%. The measured stress at 310% for curve 32 is 27 MPa. Finally, lines 48 and 50 are calculated linear regression fits to the linear portions of the strain hardening region and yield plateau region, respectively, of curve 34, and the intersection 52 of lines 48 and 50 corresponds to the natural draw ratio of the film, 370%. The measured stress at 370% for curve 24 is 26 MPa. The slopes of the yield plateau lines 38, 44 and 50 are 0.012, 0.020 and 0.002, respectively, expressed in units of MPa per percent elongation.

Films according to the invention show surprising and advantageous stress-strain properties. In particular, in one embodiment, films of the invention have a natural draw ratio of at least 250%, a tensile stress at the natural draw ratio of at least 15 MPa, and a tensile stress at second yield of at least 12 MPa.

In other embodiments, the films have the tensile stress at natural draw ratio and tensile stress at second yield described above, and the natural draw ratio is at least 250% or at least 275% or at least 300%. The upper limit of the natural draw ratio is not particularly limited, but is typically less than 600% or less than 500% or less than 400% or less than 350%.

In other embodiments, the films have the properties of any of the preceding embodiments except that the tensile stress at the natural draw ratio is at least 22 MPa or at least 24 MPa or at least 26 MPa. The upper limit of the natural draw ratio is not particularly limited, but is typically less than 60 MPa or less than 50 MPa or less than 40 MPa.

In other embodiments, the films have the properties of any of the preceding embodiments except that the tensile stress at second yield is at least 12 MPa or at least 13 MPa or at least 14 MPa or at least 15 MPa. The upper limit of the tensile stress at second yield is not particularly limited, but is generally less than 30 MPa or less than 25 MPa or less than 20 MPa.

In other embodiments, the films have the properties of any of the preceding embodiments except that the tensile stress at first yield is at least 9 MPa or at least 10 MPa. The upper limit of the tensile stress at first yield is not particularly limited, but is generally less than 30 MPa or less than 20 MPa.

In other embodiments, the films have the properties of any of the preceding embodiments except that the slope of the yield plateau is at least 0.010 or at least 0.015 or at least 0.020, expressed in units of MPa per % elongation.

In any of the embodiments described herein, the polyethylene copolymer can be any of the polyethylene copolymers described above.

Unless otherwise indicated, film properties are machine direction ("MD") properties.

6.4 Applications

There are many potential applications of films produced from the polymer blends described herein. These films can be made into other forms, such as tape, by any one of a number of well known cutting, slitting, and/or rewinding techniques. They may be useful as stretch, sealing, or oriented films.

Typical applications include:

packaging, such as bundling, packaging and unitizing a variety of products including various foodstuffs, rolls of carpet, liquid containers and various like goods normally containerized and/or palletized for shipping, storage, and/or display;

flexible food packaging, including frozen food packaging;

bags, such as trash bags and liners, industrial liners, shipping sacks and produce bags; and surface protection applications, with or without stretching, such as in the temporary protection of surfaces during manufacturing, transportation, etc.

Surfaces of the films of this invention can be modified by known and conventional post-forming techniques such as corona discharge, chemical treatment, flame treatment, and the like.

7. EXAMPLES

Materials and Methods

Tensile strength values (stress, tensile yield, ultimate tensile strength, elongation at break and elongation at yield) were measured (machine direction ("MD") and transverse direction ("TD")) in accordance with ASTM D882-97. The film gauge was measured using ASTM D5947-96 Method C, except that the micrometer calibration was performed annually with a commercially available gauge block (Starret Webber 9, JCV1&2).

1% Secant (both MD and TD) was determined in accordance with ASTM D882-97. The film gauge was measured according to ASTM D5947-96 Method C, except that the micrometer calibration was performed annually with a commercially available gauge block (Starret Webber 9, JCV1&2).

Melt Index ($I_{2.16}$), i.e., the melt flow rate at 190° C. under a load of 2.16 kg, was determined according to ASTM D-1238-95, condition E. Melt index $I_{2.16}$ is reported in units of g/10 min, or the numerically equivalent units of dg/min.

Flow Index ($I_{21.6}$), i.e., the melt flow rate at 190° C. under a load of 21.6 kg (sometimes also termed "high load melt index" or "HLMI"), was determined according to ASTM D-1238-95, condition F. Melt index $I_{21.6}$ is reported in units of g/10 min, or the numerically equivalent units of dg/min.

The ratio of two melt flow rates is the "Melt Flow Ratio" or MFR, and is most commonly the ratio of $I_{21.6}/I_{2.16}$. "MFR" can be used generally to indicate a ratio of melt flow rates measured at a higher load (numerator) to a lower load (denominator). As used herein, the term "melt index ratio" or "MIR" refers specifically to the ratio $I_{21.6}/I_{2.16}$. Melt flow ratios are dimensionless.

Density (g/cm$^3$) was determined using chips cut from plaques compression molded in accordance with ASTM D-1928-96 Procedure C, aged in accordance with ASTM D618 Procedure A, and measured according to ASTM Dl 505-96. Elmendorf tear was determined in accordance with ASTM D1922-94a. The film gauge was measured according to ASTM D374-94 Method C, except that the micrometer calibration was performed annually with a commercially available gauge block (Starret Webber 9, JCV 1 &2).

Dart Impact Strength (sometimes termed "dart drop") were measured in accordance with ASTM D1709 Method A, at 26 inches (66 cm).

The film gauge was measured according to ASTM D374-94 Method C, except that the micrometer calibration was performed annually with a commercially available gauge block (Starret Webber 9, JCV1 &2).

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982). To determine CDBI, a solubility distribution curve is first generated for the copolymer. This may be accomplished using data acquired from the TREF technique. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the polymer. The remainder of this description and the appended claims maintain this convention of assuming all fractions have Mn≧15,000 in the CDBI measurement.

As used herein, "molecular weight" indicates any of the moments of the molecular weight distribution, such as the number average, weight average, or Z-average molecular weights, and "molecular weight distribution" indicates the ratio of two such molecular weights. In general, molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. These and higher moments are included in the term "molecular weight." The desired molecular weight distribution (MWD) function (such as, for example, Mw/Mn or Mz/Mw) is the ratio of the corresponding M values. Measurement of M and MWD by conventional methods such as gel permeation chromatography is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems* 3rd ed., Hemisphere Pub. Corp., NY, (1989) 155-160; U.S. Pat. No. 4,540,753; Verstrate et al., *Macromolecules*, vol. 21, (1988) 3360; and references cited therein.

GPC measurements were made on a Waters 150C GPC instrument equipped with a differential refraction index ("DRI") detector. GPC columns are calibrated by running a series of polystyrene standards. Molecular weights of polymers other than polystyrenes are conventionally calculated by using Mark Houwink coefficients for the polymer in question.

Short Chain Branching (SCB) was determined by $^1$HNMR (proton nuclear magnetic resonance) with data collected at 500 MHz. Spectra were referenced by setting the polymer backbone signal to 1.347 ppm. Methyl group contents in ethylene 1-olefin copolymers were calculated from the $^1$HNMR spectrum using the following formula:

$$\text{Methyl Groups}/1000 \text{ Carbons} = (I_{CH_3}*0.33*1000)(I_{0.5-2.1ppm}*0.5)$$

where $I_{CH_3}$ is the normalized methyl signal area in the region between 0.88 and 1.05 ppm and $I_{0.5-2.1ppm}$ is the area between 0.50 and 2.10 ppm. The number of methyl groups will correspond to the number of short chain branches in the polymer assuming that the short chain branches contain 1 methyl (—$CH_3$) group and that all methyl groups are a result of short chain branching. The same NMR method can be used to determine vinyl end unsaturation.

Granular Bulk Density is determined as follows. Granular polymer particles are poured via a 7/8" (2.2 cm) diameter funnel into a fixed volume cylinder of 400 mL. The bulk density is measured as the weight of resin divided by 400 mL to give a value in g/mL.

Particle Size is measured by determining the weight of material collected on a series of U.S. Standard sieves and determining the weight average particle size in micrometers based on the sieve series used.

Extractability is determined according to FDA regulation 21 CFR 177.1520(d)(3)(ii).

Natural Draw Ratio is determined from a stress-elongation measurement of ASTM D882, as the elongation at the intersection of a line drawn through a linear portion of the strain hardening region and a line drawn through a linear portion of the yield plateau region. The lines are calculated as linear regression fits to the data in the linear portions of the curves. The specific range of data points subjected to the linear regression analysis can be chosen by changing the lower elongation limit in steps of, for example, 5%, keeping the overall range constant at, for example, 50% (e.g., 50-100%, 55-105%, 60-110%, etc.), and looking for the range which gives the lowest sum of squared differences between predicted and actual data.

Cling is determined according to the peel cling test of ASTM D5458-95, and is reported in units of force, such as newtons (N).

Haze is determined is accordance with ASTM D1003.

Gloss is determined in accordance with ASTM D2457 at an angle of 45°.

For measurements of film properties, the film samples were annealed by heating for 48 hours at 140° F. (60° C.) prior to testing.

Examples 1-3

Examples 1A and 1B show two examples for preparing catalysts suitable for producing polyethylene copolymers according to the invention. In Examples 2A and 2B, the catalysts of Examples 1A and 1B, respectively, are used to produce two ethylene/hexene copolymer resins, denoted A and B. In Examples 3A and 3B, the properties of the polyethylene resins and unblended monolayer films of the resins are shown. These Examples are also shown in U.S. Pat. No. 6,255,426.

Example 1A

A solution of 1300 mL of 30 wt % alumoxane (MAO) in toluene as determined by reference to the total Al content, which may include unhydrolyzed TMA, was charged to a two gallon (7.57 L), jacketed glass-walled reactor, equipped with a helical ribbon blender and an auger-type shaft. 2080 mL of toluene was added and stirred. A suspension of 31.5 g dimethylsilyl-bis-(tetrahydroindenyl) zirconium dichloride ($Me_2Si(H_4Ind)_2ZrCl_2$) in 320 mL of toluene purchased from Albemarle Labs, was cannulated to the reactor. An additional bottle of dry toluene (250 mL) was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (1040 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990, a surface modifier made from ethoxylated stearylamine sold by Witco Chemical Corp. (7 g in 73 mL toluene) was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, five additional hours of drying at 142° F. (61.1° C.) to 152° F. (66.7° C.) and vacuum which ranged from 5 inches to 22 inches Hg (127 to 559 mmHg) were used to dry the support and yield 1709.0 g of free-flowing active supported catalyst material. Head space gas chromatograph (HSGC) measurements showed 13,000 weight parts per million (1.3 wt %) of residual toluene. A second drying step under stronger vacuum conditions, resulted in HSGC analysis measurement of residual toluene at 0.18%. Elemental analysis showed 0.40% Zr, 10.75% Al, 30.89% Si, 0.27% Cl, 9.26% C, 2.05% H (all percentages shown herein are weight percent).

Example 1B

A solution of 1125 mL of 30 wt % alumoxane (MAO) in toluene as determined by reference to the total Al content, which may include unhydrolyzed TMA, was charged to a two gallon (7.57 L), jacketed glass-walled reactor, equipped with a helical ribbon blender and an auger-type shaft. 1800 mL of toluene was added and stirred. A suspension of 30.8 g dimethylsilyl-bis(tetrahydroindenyl) zirconium dichloride (Me$_2$Si(H$_4$Ind)$_2$ZrCl$_2$) in 320 mL of toluene purchased from Albemarle Labs, was cannulated into the reactor. An additional 150 mL of toluene was used to rinse solid metallocene crystals into the reactor by cannula under nitrogen pressure. A color change from colorless to yellow/orange was noted upon addition of the metallocene to the MAO solution. The mixture was allowed to stir at 69° F. (20.6° C.) for one hour, before being transferred to a four-liter Erlenmeyer flask under nitrogen. Silica (899 g, Davison MS 948, 1.65 mL/g pore volume) was charged to the reactor. Half of the solution from the 4 L Erlenmeyer flask was then transferred back to the 2 gallon (7.57 L) stirred glass reactor. The reaction temperature rose from 70° F. (21.1° C.) to 100° F. (37.8° C.) in a five minute exotherm. The balance of the solution in the 4 L Erlenmeyer flask was subsequently added back to the glass reactor, and stirred twenty minutes. Then, toluene was added (273 mL, 238 g) to dilute the active catalyst slurry, and stirred an additional twenty-five minutes. Antistat AS-990 was cannulated to the reactor and the slurry mixed for thirty minutes. Removal of solvent commenced by reducing pressure to less than 18 inches of mercury (457 mmHg) while feeding a small stream of nitrogen into the bottom of the reactor and raising the temperature from 74° F. (23.3° C.) to 142° F. (61.1° C.) over a period of one hour. Then, nine and a half additional hours of drying at 142° F. (61.1° C.) to 152° F. (66.7° C.) at a vacuum which ranged from 5 inches to 22 inches Hg (177 to 559 mmHg) were used to dry the support and yield 1291.4 g of free-flowing active supported catalyst material.

Example 2

The catalysts formed in Examples 1A and 1B were used to prepare polyethylene copolymers 2A and 2B, respectively, as follows.

The polymerization was conducted in a continuous gas phase fluidized-bed reactor having a 16.5 inch (41.9 cm) diameter with a bed height of approximately 12 feet (3.6 m). The fluidized-bed is made up of polymer granules. The gaseous feed streams of ethylene and hydrogen together with liquid comonomer were mixed together in a mixing tee arrangement and introduced below the reactor bed into the recycle gas line. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio.

The concentrations of all the gases were measured by an on-line gas chromatograph to ensure relatively constant composition in the recycle gas stream.

Solid catalyst 1A or 1B was injected directly into the fluidized-bed using purified nitrogen as a carrier. Its rate of injection was adjusted to maintain a constant production rate of the polymer. The reacting bed of growing polymer particles is maintained in a fluidized state by the continuous flow of the make-up feed and recycle gas through the reaction zone. A superficial gas velocity of 1-3 ft/s (0.3 to 0.9 m/s) was used to achieve this. The reactor was operated at a total pressure of 300 psig (2068 kPa gauge). To maintain a constant reactor temperature, the temperature of the recycle gas is continuously adjusted up or down to accommodate any changes in the rate of heat generation due to the polymerization.

The fluidized-bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small stream of humidified nitrogen to deactivate any trace quantities of residual catalyst and cocatalyst.

The polymerization conditions are summarized in Table 1.

TABLE 1

| Polymerization Conditions | 2A | 2B |
| --- | --- | --- |
| Zr (wt %) | 0.43 | 0.50 |
| Al (wt %) | 11.6 | 11.4 |
| Al/Zr (mol/mol) | 91.2 | 77.1 |
| Temperature (° C.) | 79.4 | 85 |
| Pressure (bar) | 21.7 | 21.7 |
| Ethylene (mol %) | 25.0 | 49.9 |
| Hydrogen (mol ppm) | 275 | 445 |
| Hexene (mol %) | 0.23 | 0.32 |
| Bed Weight (kg PE) | 113 | 121 |
| Production Rate (kg PE/hr) | 27.6 | 35.5 |
| Catalyst Productivity (kg PE/kg catalyst) | 1690 | 2287 |
| Bulk Density (g/mL) | 0.448 | 0.450 |
| Average Particle Size (μm) | 920 | 803 |
| Ash (ppm) | 507 | 386 |

The parameters in Table 1 were determined as described previously; the Zr, Al weight percent and ash levels were by elemental analysis. No aluminum alkyl compounds were added to the reactor as scavenger. The runs were continued for about 3 days.

Example 3

Resin properties, and properties of monolayer blown films formed from the resins using conventional film blowing equipment are shown in Tables 2-3, wherein "3A" and "3B" correspond to the resin (or film produced from the resin) produced in Examples 2A and 2B, respectively.

TABLE 2

Resin Properties

| | 3A | 3B |
| --- | --- | --- |
| Density (g/cm$^3$) | 0.9190 | 0.9257 |
| Melt Index I$_{2.16}$ (dg/min) | 1.10 | 0.62 |
| MIR, I$_{21.6}$/I$_{2.16}$ | 46.0 | 57.6 |
| Mw | 92200 | 104700 |
| Mn | 18300 | 17900 |
| Mz | 208400 | 287500 |
| Mw/Mn | 5.04 | 5.85 |
| 1st Melting Peak (° C.)[a] | 108.6 | 122.6 |
| 2nd Melting Peak (° C.)[a] | 119.3 | 117.3 |
| CDBI (%) | 86 | 83.10 |
| SCB (per 1000 C.) | 15.4 | 10.6 |
| C6 (wt %) | 9.3 | 6.4 |
| C6 (mol %) | 3.3 | 2.2 |

[a]note: the sample had been molten and been allowed to cool once previously

TABLE 3

Monolayer Blown Film Properties

| | 3A | 3B |
| --- | --- | --- |
| Blow-up Ratio | 2.5 | 2.1 |
| Gauge, mil (μm) | 2.1 (53) | 2.0 (51) |

TABLE 3-continued

Monolayer Blown Film Properties

|  | 3A | 3B |
|---|---|---|
| MD 1% Secant Modulus, psi (N/cm$^2$) | 29420 (20284) | 45070 (31075) |
| TD 1% Secant Modulus, psi (MPa) | 31230 (215) | 47420 (327) |
| Average Modulus, psi (MPa) | 30325 (209) | 46245 (319) |
| MD Elmendorf Tear, g/mil (g/μm) | 207 (8.15) | 134 (5.28) |
| TD Elmendorf Tear, g/mil (g/μm) | 430 (16.9) | 477 (18.8) |
| 26" (66 cm) Dart Impact Strength, g/mil(g/μm) | 410 (16.1) | 156 (6.14) |
| Calculated Dart Impact Strength minimum, g/mil (g/μm)$^{(a)}$ | 294 (11.6) | 123 (4.84) |
| Haze, % | 10.2 | 9.9 |
| Extractability | 1.0 | not available |

$^{(a)}$calculated from formula (1) herein.

Example 4

A larger number of additional further tests were performed with different samples made according to the invention in a similar manner, and the results are shown in Table 4. This example also shown in U.S. Pat. No. 6,255,426.

TABLE 4

| Dart Impact Strength (26 inch (66 cm)) | | | |
|---|---|---|---|
| Average Modulus | | Calculated from Formula (1), | Measured, |
| psi | MPa | g/mil (g/μm) | g/mil (g/μm) |
| 25,575 | 176 | 508 (20.0) | 611 (24.1) |
| 28,580 | 197 | 353 (13.9) | 456 (18.0) |
| 28,990 | 200 | 337 (13.3) | 553 (21.8) |
| 29,145 | 201 | 332 (13.1) | 451 (17.8) |
| 30,325 | 209 | 294 (11.6) | 410 (16.1) |
| 31,450 | 217 | 264 (10.4) | 284 (11.2) |
| 31,610 | 218 | 260 (10.2) | 257 (10.1) |
| 32,000 | 221 | 251 (9.88) | 349 (13.7) |
| 32,140 | 222 | 248 (9.76) | 223 (9.17) |
| 33,780 | 233 | 217 (8.54) | 251 (9.88) |
| 34,160 | 236 | 211 (8.31) | 262 (10.3) |
| 35,170 | 242 | 196 (7.72) | 223 (8.78) |
| 35,970 | 248 | 186 (7.32) | 261 (10.3) |
| 37,870 | 261 | 167 (6.57) | 251 (9.88) |
| 39,325 | 271 | 155 (6.10) | 197 (7.76) |
| 39,390 | 272 | 154 (6.06) | 193 (7.60) |
| 43,675 | 301 | 131 (5.16) | 167 (6.57) |
| 46,245 | 319 | 123 (4.84) | 156 (6.14) |
| 47,730 | 329 | 119 (4.69) | 147 (5.79) |
| 49,460 | 341 | 115 (4.53) | 143 (5.63) |

Example 5

Certain commercially available resins were used to provide comparative data. ELITE™ 5101 is a linear low density polyethylene (LLDPE) film resin available from The Dow Chemical Company, having a density of 0.9215 g/cm$^3$ and a melt index $I_{2.16}$ of 0.85 g/10 min. The ELITE™ 5101 resin is produced using Dow's INSITE™ single-site catalyst technology. EXCEED™ 1018 is an LLDPE film resin available from ExxonMobil Chemical Co., Houston, Tex., having a density of 0.918 g/cm$^3$ and a melt index $I_{2.16}$ of 1.0 g/10 min. The EXCEED™ 1018 resin is produced using an unbridged bis-cyclopentadienyl metallocene catalyst.

Stress versus elongation was measured according to the procedure of ASTM D882 for the three films as described above in connection with FIG. 2A. The data are shown in Tables 5-7, and plotted in FIG. 2A as described above. Curve 30 in FIG. 2A corresponds to the ELITE™ 5101 resin, curve 32 corresponds to the inventive resin, and curve 34 corresponds to the EXCEED™ 1018 resin. In each case, the stress values are machine direction (MD) values.

The Figures show a unique and advantageous combination of properties of the stretch films of the invention relative to conventional films. For example, the inventive film has a broad yield plateau at larger stresses than the comparative films, indicative of superior holding force over a wide range of elongation. The inventive film also displays a large natural draw ratio, providing usability at large elongation. The EXCEED™ film, while also having a large natural draw ratio, has a lower yield plateau stress (weaker holding force) and also a relatively flat slope. In practice, it is desirable to have a yield plateau slope that is large enough to absorb variations of at least ±5% in film thickness without suffering local deformation such as tiger-striping. The yield plateau slopes of the ELITE™ EXCEED™ and inventive films are 0.012, 0.002 and 0.020 MPa per % elongation, respectively.

TABLE 5

Stress-Elongation, ELITE™ 5101

| E (%) | Stress (MPa) |
|---|---|
| 0.00 | 0.23 |
| 0.03 | 0.33 |
| 0.05 | 0.42 |
| 0.08 | 0.52 |
| 0.11 | 0.63 |
| 0.13 | 0.71 |
| 0.16 | 0.77 |
| 0.19 | 0.87 |
| 0.21 | 0.93 |
| 0.24 | 1.00 |
| 0.27 | 1.05 |
| 0.29 | 1.15 |
| 0.32 | 1.22 |
| 0.35 | 1.32 |
| 0.37 | 1.35 |
| 0.40 | 1.44 |
| 0.43 | 1.50 |
| 0.45 | 1.58 |
| 0.48 | 1.62 |
| 0.51 | 1.69 |
| 0.53 | 1.76 |
| 0.56 | 1.84 |
| 0.59 | 1.91 |
| 0.61 | 1.96 |
| 0.64 | 2.03 |
| 0.67 | 2.07 |
| 0.69 | 2.16 |
| 0.72 | 2.20 |
| 0.75 | 2.26 |
| 0.77 | 2.32 |
| 0.80 | 2.39 |
| 0.83 | 2.46 |
| 0.85 | 2.51 |
| 0.88 | 2.59 |
| 0.91 | 2.63 |
| 0.93 | 2.69 |
| 0.96 | 2.75 |
| 0.99 | 2.84 |
| 3.59 | 9.30 |
| 6.25 | 11.30 |
| 8.91 | 11.92 |
| 11.58 | 12.22 |
| 14.24 | 12.28 |
| 16.91 | 12.26 |
| 19.58 | 12.40 |

TABLE 5-continued

Stress-Elongation, ELITE ™ 5101

| E (%) | Stress (MPa) |
|---|---|
| 22.24 | 12.48 |
| 24.91 | 12.60 |
| 27.58 | 12.64 |
| 30.24 | 12.81 |
| 32.91 | 12.91 |
| 35.58 | 13.17 |
| 38.24 | 13.28 |
| 40.91 | 13.42 |
| 43.58 | 13.58 |
| 46.24 | 13.79 |
| 48.91 | 13.89 |
| 51.58 | 14.03 |
| 54.24 | 14.09 |
| 56.91 | 14.20 |
| 59.58 | 14.31 |
| 62.24 | 14.34 |
| 64.91 | 14.46 |
| 67.58 | 14.40 |
| 70.24 | 14.45 |
| 72.91 | 14.51 |
| 75.58 | 14.52 |
| 78.24 | 14.53 |
| 80.91 | 14.57 |
| 83.58 | 14.57 |
| 86.24 | 14.59 |
| 88.91 | 14.62 |
| 91.58 | 14.68 |
| 94.24 | 14.68 |
| 96.91 | 14.72 |
| 99.58 | 14.78 |
| 102.24 | 14.81 |
| 104.91 | 14.87 |
| 107.58 | 14.88 |
| 110.24 | 14.96 |
| 112.91 | 15.03 |
| 115.58 | 15.08 |
| 118.24 | 15.07 |
| 120.91 | 15.16 |
| 123.58 | 15.24 |
| 126.24 | 15.32 |
| 128.91 | 15.36 |
| 131.58 | 15.44 |
| 134.24 | 15.48 |
| 136.91 | 15.57 |
| 139.58 | 15.68 |
| 142.25 | 15.71 |
| 144.91 | 15.82 |
| 147.58 | 15.81 |
| 150.24 | 15.89 |
| 152.91 | 16.01 |
| 155.58 | 16.10 |
| 158.24 | 16.26 |
| 160.91 | 16.35 |
| 163.58 | 16.52 |
| 166.25 | 16.69 |
| 168.91 | 16.84 |
| 171.58 | 17.08 |
| 174.24 | 17.19 |
| 176.91 | 17.46 |
| 179.58 | 17.62 |
| 182.24 | 17.79 |
| 184.91 | 18.02 |
| 187.58 | 18.16 |
| 190.24 | 18.35 |
| 192.91 | 18.62 |
| 195.58 | 18.91 |
| 198.24 | 19.15 |
| 200.91 | 19.36 |
| 203.58 | 19.57 |
| 206.24 | 19.89 |
| 208.91 | 20.18 |
| 211.58 | 20.51 |
| 214.24 | 20.78 |
| 216.91 | 21.12 |
| 219.58 | 21.46 |
| 222.24 | 21.84 |
| 224.91 | 22.27 |
| 227.58 | 22.58 |
| 230.24 | 23.01 |
| 232.91 | 23.46 |
| 235.58 | 23.94 |
| 238.25 | 24.39 |
| 240.91 | 24.93 |
| 243.58 | 25.44 |
| 246.24 | 26.00 |
| 248.91 | 26.60 |
| 251.58 | 27.23 |
| 254.24 | 27.75 |
| 256.91 | 28.41 |
| 264.24 | 30.05 |
| 271.58 | 31.84 |
| 274.24 | 32.47 |
| 276.91 | 33.22 |
| 279.58 | 33.97 |
| 282.24 | 34.63 |
| 284.91 | 35.33 |
| 287.58 | 36.07 |
| 290.24 | 36.84 |
| 292.91 | 37.66 |
| 295.58 | 38.50 |
| 298.24 | 39.33 |
| 300.91 | 40.30 |
| 303.58 | 41.16 |
| 306.24 | 42.04 |
| 308.91 | 42.93 |
| 311.58 | 43.87 |
| 314.24 | 44.72 |
| 316.91 | 45.67 |
| 319.58 | 46.66 |
| 322.24 | 47.59 |
| 324.91 | 48.57 |
| 327.58 | 49.60 |
| 330.24 | 50.70 |
| 332.91 | 51.80 |
| 335.58 | 53.04 |
| 338.24 | 54.13 |
| 340.91 | 55.27 |
| 343.58 | 56.27 |
| 346.24 | 57.34 |
| 348.91 | 58.21 |
| 351.58 | 59.24 |

TABLE 6

Stress-Elongation, inventive film

| E (%) | Stress (MPa) |
|---|---|
| 0.00 | 0.34 |
| 0.03 | 0.36 |
| 0.05 | 0.45 |
| 0.08 | 0.55 |
| 0.11 | 0.61 |
| 0.13 | 0.70 |
| 0.16 | 0.77 |
| 0.19 | 0.83 |
| 0.21 | 0.89 |
| 0.24 | 0.99 |
| 0.27 | 0.99 |
| 0.29 | 1.11 |
| 0.32 | 1.17 |
| 0.35 | 1.21 |
| 0.37 | 1.27 |
| 0.40 | 1.34 |

TABLE 6-continued

Stress-Elongation, inventive film

| E (%) | Stress (MPa) |
|---|---|
| 0.43 | 1.41 |
| 0.45 | 1.46 |
| 0.48 | 1.54 |
| 0.51 | 1.59 |
| 0.53 | 1.63 |
| 0.56 | 1.72 |
| 0.59 | 1.78 |
| 0.61 | 1.82 |
| 0.64 | 1.89 |
| 0.67 | 1.95 |
| 0.69 | 2.00 |
| 0.72 | 2.04 |
| 0.75 | 2.08 |
| 0.77 | 2.13 |
| 0.80 | 2.21 |
| 0.83 | 2.24 |
| 0.85 | 2.32 |
| 0.88 | 2.35 |
| 0.91 | 2.43 |
| 0.93 | 2.48 |
| 0.96 | 2.55 |
| 0.99 | 2.59 |
| 1.02 | 2.64 |
| 1.61 | 4.46 |
| 4.15 | 8.70 |
| 6.80 | 10.07 |
| 9.47 | 10.53 |
| 12.13 | 10.74 |
| 14.80 | 10.88 |
| 17.47 | 10.90 |
| 20.14 | 11.06 |
| 22.80 | 11.13 |
| 25.47 | 11.32 |
| 28.13 | 11.51 |
| 30.80 | 11.67 |
| 33.47 | 12.00 |
| 36.14 | 12.19 |
| 38.80 | 12.44 |
| 41.47 | 12.73 |
| 44.13 | 13.04 |
| 46.80 | 13.34 |
| 49.47 | 13.72 |
| 52.14 | 14.00 |
| 54.80 | 14.28 |
| 57.47 | 14.54 |
| 60.14 | 14.82 |
| 62.80 | 15.12 |
| 65.47 | 15.38 |
| 68.14 | 15.54 |
| 70.80 | 15.78 |
| 73.47 | 15.88 |
| 76.14 | 16.01 |
| 78.80 | 16.14 |
| 81.47 | 16.17 |
| 84.14 | 16.39 |
| 86.80 | 16.37 |
| 89.47 | 16.43 |
| 92.13 | 16.61 |
| 94.80 | 16.62 |
| 97.47 | 16.65 |
| 100.13 | 16.74 |
| 102.80 | 16.77 |
| 105.47 | 16.87 |
| 108.14 | 16.99 |
| 110.80 | 17.02 |
| 113.47 | 17.06 |
| 116.14 | 17.09 |
| 118.80 | 17.15 |
| 121.47 | 17.22 |
| 124.14 | 17.28 |
| 126.80 | 17.31 |
| 129.80 | 17.41 |
| 137.14 | 17.55 |
| 144.14 | 17.66 |
| 146.80 | 17.77 |
| 149.47 | 17.82 |
| 152.14 | 17.95 |
| 154.80 | 17.89 |
| 157.47 | 18.02 |
| 160.14 | 18.05 |
| 162.80 | 18.15 |
| 165.47 | 18.21 |
| 168.14 | 18.28 |
| 170.80 | 18.46 |
| 173.47 | 18.41 |
| 176.14 | 18.56 |
| 178.80 | 18.63 |
| 181.47 | 18.68 |
| 184.14 | 18.76 |
| 186.80 | 18.88 |
| 189.47 | 18.97 |
| 192.14 | 19.06 |
| 194.80 | 19.19 |
| 197.47 | 19.20 |
| 200.14 | 19.29 |
| 202.80 | 19.43 |
| 205.47 | 19.52 |
| 208.14 | 19.68 |
| 210.80 | 19.80 |
| 213.47 | 19.91 |
| 216.14 | 19.96 |
| 218.80 | 20.12 |
| 221.47 | 20.29 |
| 224.14 | 20.40 |
| 226.80 | 20.64 |
| 229.47 | 20.73 |
| 232.14 | 20.83 |
| 234.80 | 20.91 |
| 237.47 | 21.08 |
| 240.14 | 21.18 |
| 242.80 | 21.39 |
| 245.47 | 21.46 |
| 248.14 | 21.66 |
| 250.80 | 21.88 |
| 253.47 | 22.04 |
| 256.14 | 22.25 |
| 258.80 | 22.38 |
| 261.47 | 22.52 |
| 264.14 | 22.68 |
| 266.80 | 22.92 |
| 269.47 | 23.15 |
| 272.14 | 23.37 |
| 274.80 | 23.64 |
| 277.47 | 23.95 |
| 280.14 | 24.26 |
| 282.80 | 24.53 |
| 285.47 | 24.78 |
| 288.14 | 24.96 |
| 290.80 | 25.26 |
| 293.47 | 25.57 |
| 296.14 | 25.74 |
| 298.80 | 26.06 |
| 301.47 | 26.34 |
| 304.14 | 26.56 |
| 306.80 | 26.89 |
| 309.47 | 27.21 |
| 312.14 | 27.48 |
| 314.80 | 27.78 |
| 317.47 | 28.03 |
| 320.14 | 28.42 |
| 322.80 | 28.68 |
| 325.47 | 28.99 |
| 328.14 | 29.38 |
| 330.80 | 29.76 |
| 333.47 | 30.03 |
| 336.14 | 30.46 |
| 338.80 | 30.84 |
| 341.47 | 31.22 |

TABLE 6-continued

Stress-Elongation, inventive film

| E (%) | Stress (MPa) |
|---|---|
| 344.14 | 31.73 |
| 346.80 | 32.04 |
| 349.47 | 32.47 |
| 352.13 | 32.87 |
| 354.80 | 33.35 |
| 357.47 | 33.73 |
| 360.14 | 34.24 |
| 362.80 | 34.72 |
| 365.47 | 35.14 |
| 368.14 | 35.55 |
| 370.80 | 36.01 |
| 373.47 | 36.54 |
| 376.14 | 36.93 |
| 378.80 | 37.54 |
| 381.47 | 38.14 |
| 384.13 | 38.64 |
| 386.80 | 39.23 |
| 389.47 | 39.74 |
| 392.14 | 40.27 |
| 395.14 | 40.89 |
| 402.14 | 42.23 |
| 409.14 | 43.84 |
| 411.80 | 44.37 |
| 414.47 | 44.97 |
| 417.14 | 45.63 |
| 419.80 | 46.23 |
| 422.47 | 46.78 |
| 425.14 | 47.45 |
| 427.80 | 48.02 |
| 430.47 | 48.73 |
| 433.14 | 49.30 |
| 435.80 | 49.93 |
| 438.47 | 50.65 |
| 441.14 | 51.19 |
| 443.80 | 51.78 |
| 446.47 | 52.31 |
| 449.14 | 53.03 |
| 451.80 | 53.67 |
| 454.47 | 54.37 |
| 457.14 | 54.88 |
| 459.80 | 55.46 |
| 462.47 | 56.09 |
| 465.14 | 56.71 |
| 467.80 | 57.41 |
| 470.47 | 58.00 |
| 473.14 | 58.61 |
| 475.80 | 59.28 |
| 478.47 | 59.83 |
| 481.14 | 60.47 |
| 483.80 | 61.01 |
| 486.47 | 61.55 |
| 489.14 | 62.09 |
| 491.80 | 62.72 |
| 494.47 | 63.26 |
| 497.14 | 63.87 |
| 499.80 | 64.45 |
| 502.47 | 65.00 |
| 505.14 | 65.70 |

TABLE 7

Stress-Elongation, EXCEED ™ 1018

| E (%) | Stress (MPa) |
|---|---|
| 0.00 | 0.31 |
| 0.03 | 0.35 |
| 0.06 | 0.43 |
| 0.08 | 0.49 |
| 0.11 | 0.51 |
| 0.14 | 0.60 |
| 0.16 | 0.67 |
| 0.19 | 0.68 |
| 0.22 | 0.72 |
| 0.24 | 0.74 |
| 0.27 | 0.79 |
| 0.30 | 0.85 |
| 0.32 | 0.89 |
| 0.35 | 0.92 |
| 0.38 | 0.97 |
| 0.40 | 0.98 |
| 0.43 | 1.03 |
| 0.46 | 1.10 |
| 0.48 | 1.12 |
| 0.51 | 1.19 |
| 0.54 | 1.23 |
| 0.56 | 1.26 |
| 0.59 | 1.32 |
| 0.62 | 1.35 |
| 0.64 | 1.36 |
| 0.67 | 1.41 |
| 0.70 | 1.46 |
| 0.72 | 1.48 |
| 0.75 | 1.55 |
| 0.78 | 1.55 |
| 0.80 | 1.57 |
| 0.83 | 1.66 |
| 0.86 | 1.68 |
| 0.88 | 1.72 |
| 0.91 | 1.75 |
| 0.94 | 1.76 |
| 0.96 | 1.83 |
| 0.99 | 1.84 |
| 1.03 | 1.91 |
| 2.02 | 3.90 |
| 4.63 | 6.85 |
| 7.29 | 7.98 |
| 9.96 | 8.54 |
| 12.63 | 8.77 |
| 15.29 | 8.95 |
| 17.96 | 8.97 |
| 20.63 | 9.06 |
| 23.29 | 9.11 |
| 25.96 | 9.24 |
| 33.29 | 9.61 |
| 40.29 | 9.89 |
| 42.96 | 10.04 |
| 45.63 | 10.17 |
| 48.29 | 10.28 |
| 50.96 | 10.33 |
| 53.63 | 10.40 |
| 56.29 | 10.47 |
| 58.96 | 10.64 |
| 61.63 | 10.60 |
| 64.29 | 10.64 |
| 66.96 | 10.63 |
| 69.63 | 10.65 |
| 72.29 | 10.71 |
| 74.96 | 10.78 |
| 77.63 | 10.76 |
| 80.29 | 10.72 |
| 82.96 | 10.74 |
| 85.63 | 10.74 |
| 88.29 | 10.69 |
| 90.96 | 10.83 |
| 93.63 | 10.81 |
| 96.29 | 10.78 |
| 98.96 | 10.79 |
| 101.63 | 10.86 |
| 104.29 | 10.83 |
| 106.96 | 10.79 |
| 109.63 | 10.75 |
| 112.29 | 10.82 |
| 114.96 | 10.82 |

TABLE 7-continued

Stress-Elongation, EXCEED ™ 1018

| E (%) | Stress (MPa) |
|---|---|
| 117.63 | 10.94 |
| 120.29 | 10.78 |
| 122.96 | 10.78 |
| 125.63 | 10.68 |
| 128.29 | 10.72 |
| 130.96 | 10.76 |
| 133.63 | 10.90 |
| 136.29 | 10.92 |
| 138.96 | 11.06 |
| 141.63 | 11.10 |
| 144.29 | 11.08 |
| 146.96 | 11.12 |
| 149.63 | 11.14 |
| 152.29 | 11.14 |
| 154.96 | 11.18 |
| 157.63 | 11.17 |
| 160.29 | 11.24 |
| 162.96 | 11.21 |
| 165.63 | 11.29 |
| 168.29 | 11.35 |
| 170.96 | 11.29 |
| 173.63 | 11.40 |
| 176.29 | 11.39 |
| 178.96 | 11.43 |
| 181.63 | 11.49 |
| 184.29 | 11.53 |
| 186.96 | 11.51 |
| 189.63 | 11.61 |
| 192.29 | 11.64 |
| 194.96 | 11.67 |
| 197.63 | 11.74 |
| 200.29 | 11.74 |
| 202.96 | 11.76 |
| 205.63 | 11.83 |
| 208.29 | 11.96 |
| 210.96 | 12.00 |
| 213.63 | 12.14 |
| 216.29 | 12.23 |
| 218.96 | 12.39 |
| 221.63 | 12.47 |
| 224.29 | 12.62 |
| 226.96 | 12.65 |
| 229.63 | 12.89 |
| 232.29 | 12.91 |
| 234.96 | 13.11 |
| 237.63 | 13.19 |
| 240.29 | 13.34 |
| 242.96 | 13.44 |
| 245.63 | 13.50 |
| 248.29 | 13.61 |
| 250.96 | 13.66 |
| 253.63 | 13.82 |
| 256.29 | 13.87 |
| 258.96 | 14.01 |
| 261.63 | 14.14 |
| 264.29 | 14.27 |
| 266.96 | 14.26 |
| 269.63 | 14.45 |
| 272.29 | 14.58 |
| 274.96 | 14.75 |
| 277.63 | 14.93 |
| 280.29 | 15.08 |
| 282.96 | 15.24 |
| 285.63 | 15.48 |
| 288.29 | 15.69 |
| 291.29 | 15.83 |
| 298.63 | 16.44 |
| 305.63 | 17.01 |
| 308.29 | 17.20 |
| 310.96 | 17.44 |
| 313.63 | 17.71 |
| 316.29 | 18.12 |
| 318.96 | 18.37 |
| 321.63 | 18.60 |
| 324.29 | 18.93 |
| 326.96 | 19.31 |
| 329.63 | 19.70 |
| 332.29 | 19.91 |
| 334.96 | 20.17 |
| 337.63 | 20.47 |
| 340.29 | 20.83 |
| 342.96 | 21.18 |
| 345.62 | 21.47 |
| 348.29 | 21.86 |
| 350.96 | 22.18 |
| 353.63 | 22.61 |
| 356.29 | 23.08 |
| 358.96 | 23.57 |
| 361.63 | 24.01 |
| 364.29 | 24.44 |
| 366.96 | 25.08 |
| 369.62 | 25.59 |
| 372.29 | 26.09 |
| 374.96 | 26.63 |
| 377.63 | 27.08 |
| 380.29 | 27.55 |
| 382.96 | 28.10 |
| 385.63 | 28.53 |
| 388.29 | 29.02 |
| 390.96 | 29.59 |
| 393.63 | 30.17 |
| 396.29 | 30.60 |
| 398.96 | 31.31 |
| 401.63 | 31.82 |
| 404.29 | 32.51 |
| 406.96 | 33.11 |
| 409.63 | 33.75 |
| 412.29 | 34.35 |
| 414.96 | 35.01 |
| 417.63 | 35.80 |
| 420.29 | 36.50 |
| 422.96 | 37.36 |
| 425.63 | 38.22 |
| 428.29 | 39.03 |
| 430.96 | 39.84 |
| 433.63 | 40.66 |
| 436.29 | 41.41 |
| 438.96 | 42.35 |
| 441.63 | 43.24 |
| 444.29 | 44.14 |
| 446.96 | 44.92 |
| 449.63 | 45.83 |
| 452.29 | 46.65 |
| 454.96 | 47.54 |
| 457.63 | 48.38 |
| 460.29 | 49.42 |
| 462.96 | 50.38 |
| 465.63 | 51.48 |
| 468.29 | 52.46 |
| 470.96 | 53.43 |
| 473.62 | 54.56 |
| 476.29 | 55.62 |
| 478.96 | 56.78 |
| 481.63 | 57.94 |
| 484.29 | 59.04 |
| 486.96 | 60.12 |
| 489.63 | 61.24 |
| 492.29 | 62.37 |
| 494.96 | 63.41 |
| 497.63 | 64.53 |
| 500.29 | 65.68 |
| 502.96 | 66.75 |
| 505.63 | 67.89 |
| 508.29 | 69.09 |
| 510.96 | 70.16 |
| 513.63 | 71.29 |
| 516.29 | 72.45 |
| 518.96 | 73.63 |

TABLE 7-continued

Stress-Elongation, EXCEED ™ 1018

| E (%) | Stress (MPa) |
|---|---|
| 521.63 | 74.67 |
| 524.29 | 75.85 |
| 526.96 | 76.92 |
| 529.63 | 78.07 |
| 532.29 | 79.12 |
| 534.96 | 80.22 |
| 537.63 | 81.45 |
| 540.29 | 82.80 |
| 542.96 | 84.14 |
| 545.63 | 85.41 |

Examples 6-10 and Comparative Examples 1-4

Blown films were prepared from several inventive and comparative film resin compositions. The compositions included polyisobutylene (PIB) in the weight percents indicated in Tables 8 and 9, as a tackifier. Several compositions included a small amount of linear low density polyethylene (LDPE). The LDPE was a 0.3 melt index, 0.922 density high-pressure polyethylene.

For Examples 6-10, 20 μm blown films were formed on a monolayer blown film extrusion line having an extruder diameter of 90 mm, an L/D ratio of 24, a die of 300 mm diameter and equipped with a dual lip air ring. The temperature setting on the extruder was 170-180° C., and 190° C. on the adapter and die. The blow-up ratio was 3.2, and the frost line height was 900 mm. In Examples 6-9, the die gap was 2.3 mm, and in Example 10, the die gap was 1.2 mm. The output was 150 kg/hr.

TABLE 8

| Property | Example No. | | | | |
|---|---|---|---|---|---|
| | 6 | 7 | 8 | 9 | 10 |
| PIB (wt. %) | 4.4 | 4.4 | 5.2 | 5.2 | 5.2 |
| LDPE (wt. %) | 0 | 6 | 3 | 0 | 4 |
| Tensile at 1st Yield, MD (MPa) | 10.2 | 11.2 | 11.2 | 11 | 11.8 |
| Tensile at 1st Yield, TD (MPa) | 10.9 | 11.7 | 11.6 | 11.0 | 12.5 |
| Tensile at 2nd Yield, MD (MPa) | 14 | 17 | 16 | 16 | 15.4 |
| Tensile at Break, MD (MPa) | 53.3 | 51.9 | 54.7 | 60.8 | 52.4 |
| Tensile at Break, TD (MPa) | 51.1 | 41.1 | 39.9 | 45.0 | 46.7 |
| Elongation at Break, MD (%) | 528 | 524 | 529 | 533 | 634 |
| Elongation at Break, TD (%) | 670 | 650 | 595 | 638 | 578 |
| Energy to Break, MD (mJ/mm³) | 123 | 135 | 134 | 144 | 123 |
| Energy to Break, TD (mJ/mm³) | 130 | 111 | 101 | 115 | 137 |
| 1% Secant Modulus, MD (MPa) | 166 | 203 | 210 | 202 | 217 |
| 1% Secant Modulus, TD (MPa) | 204 | 269 | 249 | 215 | 263 |
| Elmendorf Tear, MD (g/μm) | 8.5 | 4.4 | 8.2 | 9.1 | 8.5 |
| Elmendorf Tear, TD (g/μm) | 23.0 | 27.7 | 23.3 | 28.3 | 24.2 |
| Natural Draw Ratio, MD (%) | 330 | 330 | 330 | 350 | 355 |
| Tensile Stress at Natural Draw Ratio (MPa) | 24 | 26 | 26.5 | 28.5 | 25 |
| Cling, inside (cN) | 122 | 149 | 164 | 130 | |

In Comparative Examples 1-4, 20 μm blown films were produced using several conventional polyethylene film resin compositions. Each composition included the amounts of PIB and LDPE shown in Table 9. In Comparative Example 1, the film resin was DOWLEX™ 5056, a Ziegler-Natta LLDPE resin available from The Dow Chemical Co. In Examples 2-4, the film resin was EXCEED™ 1018, described above.

The films of Comparative Examples 1-4 were formed on a monolayer blown film extrusion line having an extruder diameter of 90 mm, an L/D ratio of 30, a die of 400 mm diameter, a die gap of 2.0 mm, and equipped with a dual lip air ring. The temperature setting on the extruder was 220-250° C., and on the adapter and die 250° C. The output was 208 kg/hr. The data are shown in Table 9.

TABLE 9

| Property | Comparative Example No. | | | |
|---|---|---|---|---|
| | 1 | 2 | 3 | 4 |
| PIB (wt. %) | 3.8 | 3.0 | 3.4 | 3.8 |
| LDPE (wt. %) | 8 | 8 | 8 | 8 |
| Tensile at 1st Yield, MD (MPa) | 9.6 | 9.1 | 9.3 | 9.9 |
| Tensile at 1st Yield, TD (MPa) | 9.6 | 8.5 | 8.7 | 8.9 |
| Tensile at 2nd Yield, MD (MPa) | 13.5 | 12.4 | 12.8 | 13.5 |
| Tensile at Break, MD (MPa) | 53.2 | 54.4 | 57.6 | 54.4 |
| Tensile at Break, TD (MPa) | 37.1 | 43.9 | 53.7 | 50.3 |
| Elongation at Break, MD (%) | 560 | 583 | 615 | 556 |
| Elongation at Break, TD (%) | 793 | 671 | 717 | 713 |
| Natural Draw Ratio (%) | 270 | 395 | 385 | 340 |
| Tensile Stress at NDR (MPa) | 27 | 21 | 21 | 20 |
| Energy to Break, MD (mJ/mm³) | 133 | 120 | 135 | 120 |
| Energy to Break, TD (mJ/mm³) | 118 | 106 | 131 | 126 |
| 1% Secant Modulus, MD (MPa) | 158 | 139 | 151 | 139 |
| 1% Secant Modulus, TD (MPa) | 175 | 166 | 170 | 176 |
| Initial Stress[a] (MPa) | 12.6 | 13.2 | 14.3 | 14.3 |
| Stress at 30 min.[a] (MPa) | 7.6 | 8.4 | 9.2 | 9.1 |
| Stress Retention[a] (%) | 60.5 | 63.8 | 63.9 | 63.7 |
| Dart Impact (g/μm) | 5.6 | 36.2 | 51.6 | 40.5 |
| Dart Impact after 48 h at 60° C. (g/μm) | 5.4 | 42.5 | 40.8 | 39.4 |
| Elmendorf Tear, MD (g/μm) | 4.5 | 6.2 | 7.2 | 5.7 |
| Elmendorf Tear, TD (g/μm) | 37.6 | 24.3 | 23.2 | 24.1 |
| Puncture Force at Break (N/μm) | 1.7 | 2.2 | 1.9 | 2.4 |
| Puncture Energy at Break (mJ/μm) | 102 | 165 | 140 | 162 |
| Haze (%) | 2.45 | 2.79 | 2.09 | 2.40 |
| Gloss (%) | 12.9 | 13.3 | 13.4 | 13.0 |

The Examples in Table 9 show that with addition of LDPE to conventional or metallocene LLDPE, it is possible to increase the second yield point and the tensile stress at natural draw ratio values closer to the inventive films as shown in Table 8. However, the slope of the yield plateau remains flat or even negative, showing that the comparative films are disadvantageously susceptible to formation of "tiger stripes", overstretching, and possible breakage during stretching.

All patents, test procedures, and other documents cited herein, including priority documents, are fully incorporated by reference to the extent such disclosure is not inconsistent with this invention and for all jurisdictions in which such incorporation is permitted.

What is claimed is:

1. A wrapped article comprising:
   an article;
   a stretch film;
   wherein the stretch film is elongated to the yield plateau and less than the natural draw ratio; and
   the article is wrapped with the stretch film, the stretch film comprising:
   at least one first layer; and
   at least one second layer not comprising a LDPE, wherein any one or more layers comprises a polyethylene copolymer with a Compositional Distribution Breadth Index (CDBI) of at least 70%, a melt index $I_{2.16}$ of from 0.1 to 15 g/10 min., a density of from 0.910 to 0.940 g/cm³, a melt index ratio $I_{21.6}/I_{2.16}$ of from 30 to 80, and an Mw/Mn ratio of from 2.5 to 5.5 and from 0.25 to 6 wt % of one or more tackifiers, wherein:
   the film having a natural draw ratio of at least 250%, a tensile stress at the natural draw ratio of at least 22 MPa, and a tensile stress at second yield point of at least 12 MPa, as measured according to ASTM D-882/97; and the film having a yield plateau having a linear portion with a slope of at least 0.020 MPa per % elongation interposed between the second yield point and the natural draw ratio.

2. The wrapped article of claim 1, wherein the film has a dart impact strength D, a modulus M, where M is the arithmetic mean of the machine direction and transverse direction 1% secant moduli, and a relation between D in g/μm and M in MPa such that:

$$D \geq 0.0315 \left[ 100 + e^{\left(11.71 - 0.03887M + 4.592 \times 10^{-5}M^2\right)} \right].$$

3. The wrapped article of claim 1, wherein the tensile stress at the natural draw ratio is at least 26 MPa, and the natural draw ratio is at least 300%.

4. The wrapped article of claim 1, wherein the film has a tensile stress at first yield of at least 9 MPa, and a second yield of at least 14 MPa, both yields measured according to ASTM D-882/97.

5. The wrapped article of claim 1, wherein the CDBI is at least 85%; the melt index ratio is from 35 to 60; and the Mw/Mn ratio is from 3.0 to 4.0.

6. The wrapped article of claim 1, wherein the melt index is from 0.3 to 10 g/10 min, and the density is from 0.918 to 0.935 g/cm$^3$.

7. The wrapped article of claim 1, wherein the stretch film is provided in a pre-stretched condition.

\* \* \* \* \*